(12) United States Patent
Van Hook et al.

(10) Patent No.: US 7,576,748 B2
(45) Date of Patent: *Aug. 18, 2009

(54) GRAPHICS SYSTEM WITH EMBEDDED FRAME BUTTER HAVING RECONFIGURABLE PIXEL FORMATS

(75) Inventors: Timothy J. Van Hook, Atherton, CA (US); Farhad Fouladi, Los Altos Hills, CA (US)

(73) Assignee: Nintendo Co. Ltd., Kyoto (JP)

( * ) Notice: Subject to any disclaimer, the term of this patent is extended or adjusted under 35 U.S.C. 154(b) by 193 days.

This patent is subject to a terminal disclaimer.

(21) Appl. No.: 11/398,531

(22) Filed: Apr. 6, 2006

(65) Prior Publication Data

US 2006/0197768 A1 Sep. 7, 2006

Related U.S. Application Data

(63) Continuation of application No. 11/082,854, filed on Mar. 18, 2005, now Pat. No. 7,075,545, which is a continuation of application No. 09/722,380, filed on Nov. 28, 2000, now Pat. No. 6,937,245.

(51) Int. Cl.
*G09G 5/36* (2006.01)
*G09G 5/397* (2006.01)
*G09G 5/02* (2006.01)

(52) U.S. Cl. .................. 345/546; 345/545; 345/547; 345/604; 345/605

(58) Field of Classification Search ......... 345/545–547, 345/542, 422, 600, 603–605, 611, 613
See application file for complete search history.

(56) References Cited

U.S. PATENT DOCUMENTS

| 4,275,413 A | 6/1981 | Sakamoto et al. |
| 4,357,624 A | 11/1982 | Greenberg |
| 4,463,380 A | 7/1984 | Hooks, Jr. |

(Continued)

FOREIGN PATENT DOCUMENTS

EP 0 637 813 A2 2/1995

(Continued)

OTHER PUBLICATIONS

GDC 2000: Advanced OpenGL Game Development, "A Practical and Robust Bump-mapping Technique for Today'GPUs," by Mark Kilgard, Jul. 5, 2000, www.nvidia.com.

(Continued)

*Primary Examiner*—Hau H Nguyen
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. The graphics system has a graphics processor includes an embedded frame buffer for storing frame data prior to sending the frame data to an external location, such as main memory. The embedded frame buffer is selectively configurable to store the following pixel formats: point sampled RGB color and depth, super-sampled RGB color and depth, and YUV (luma/chroma). Graphics commands are provided which enable the programmer to configure the embedded frame buffer for any of the pixel formats on a frame-by-frame basis.

18 Claims, 23 Drawing Sheets

(Embedded Frame Buffer Organization)

U.S. PATENT DOCUMENTS

| | | |
|---|---|---|
| 4,491,836 A | 1/1985 | Collmeyer et al. |
| 4,586,038 A | 4/1986 | Sims et al. |
| 4,600,919 A | 7/1986 | Stern |
| 4,615,013 A | 9/1986 | Yan et al. |
| 4,625,289 A | 11/1986 | Rockwood |
| 4,653,012 A | 3/1987 | Duffy et al. |
| 4,692,880 A | 9/1987 | Merz et al. |
| 4,695,943 A | 9/1987 | Keeley et al. |
| 4,710,876 A | 12/1987 | Cline et al. |
| 4,768,148 A | 8/1988 | Keeley et al. |
| 4,785,395 A | 11/1988 | Keeley |
| 4,790,025 A | 12/1988 | Inoue et al. |
| 4,808,988 A | 2/1989 | Burke et al. |
| 4,812,988 A | 3/1989 | Duthuit et al. |
| 4,817,175 A | 3/1989 | Tenenbaum et al. |
| 4,829,452 A | 5/1989 | Kang et al. |
| 4,833,601 A | 5/1989 | Barlow et al. |
| 4,855,934 A | 8/1989 | Robinson |
| 4,888,712 A | 12/1989 | Barkans et al. |
| 4,897,806 A | 1/1990 | Cook et al. |
| 4,907,174 A | 3/1990 | Priem |
| 4,918,625 A | 4/1990 | Yan |
| 4,935,879 A | 6/1990 | Ueda |
| 4,965,751 A | 10/1990 | Thayer et al. |
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,144,291 A | 9/1992 | Nishizawa |
| 5,163,126 A | 11/1992 | Einkauf et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,307,450 A | 4/1994 | Grossman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,506,604 A | 4/1996 | Nally et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,573,402 A | 11/1996 | Gray |
| 5,579,456 A | 11/1996 | Cosman |
| 5,586,234 A | 12/1996 | Sakuraba et al. |
| 5,593,350 A | 1/1997 | Bouton et al. |
| 5,600,763 A | 2/1997 | Greene et al. |
| 5,606,650 A | 2/1997 | Kelley et al. |
| 5,607,157 A | 3/1997 | Nagashima |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |
| 5,691,746 A | 11/1997 | Shyu |
| 5,694,143 A | 12/1997 | Fielder et al. |
| 5,696,892 A | 12/1997 | Redmann et al. |
| 5,703,806 A | 12/1997 | Puar et al. |
| 5,706,481 A | 1/1998 | Hannah et al. |
| 5,706,482 A | 1/1998 | Matsushima et al. |
| 5,714,981 A | 2/1998 | Scott-Jackson et al. |
| 5,724,561 A | 3/1998 | Tarolli et al. |
| 5,726,689 A | 3/1998 | Negishi et al. |
| 5,726,947 A | 3/1998 | Yamazaki et al. |
| 5,734,386 A | 3/1998 | Cosman |
| 5,739,819 A | 4/1998 | Bar-Nahum |
| 5,740,343 A | 4/1998 | Tarolli et al. |
| 5,740,383 A | 4/1998 | Nally et al. |
| 5,740,406 A | 4/1998 | Rosenthal et al. |
| 5,742,749 A | 4/1998 | Foran et al. |
| 5,742,788 A | 4/1998 | Priem et al. |
| 5,745,118 A | 4/1998 | Alcorn et al. |
| 5,745,125 A | 4/1998 | Deering et al. |
| 5,748,199 A | 5/1998 | Palm |
| 5,748,986 A | 5/1998 | Butterfield et al. |
| 5,751,291 A | 5/1998 | Olsen et al. |
| 5,751,292 A | 5/1998 | Emmot |
| 5,751,295 A | 5/1998 | Becklund et al. |
| 5,751,930 A | 5/1998 | Katsura et al. |
| 5,754,191 A | 5/1998 | Mills et al. |

| | | | | | |
|---|---|---|---|---|---|
| 5,757,382 A | 5/1998 | Lee | 5,933,154 A | 8/1999 | Howard et al. |
| 5,760,783 A | 6/1998 | Migdal et al. | 5,933,155 A | 8/1999 | Akeley |
| 5,764,228 A | 6/1998 | Baldwin | 5,933,529 A | 8/1999 | Kim |
| 5,764,237 A | 6/1998 | Kaneko | 5,936,641 A | 8/1999 | Jain et al. |
| 5,767,856 A | 6/1998 | Peterson et al. | 5,936,683 A | 8/1999 | Lin |
| 5,767,858 A | 6/1998 | Kawase et al. | 5,940,089 A | 8/1999 | Dilliplane et al. |
| 5,768,629 A | 6/1998 | Wise et al. | 5,940,538 A | 8/1999 | Spiegel et al. |
| 5,777,623 A | 7/1998 | Small | 5,943,058 A | 8/1999 | Nagy |
| 5,781,927 A | 7/1998 | Wu et al. | 5,943,060 A | 8/1999 | Cosman et al. |
| 5,791,994 A | 8/1998 | Hirano et al. | 5,945,997 A | 8/1999 | Zhao et al. |
| 5,801,711 A | 9/1998 | Koss et al. | 5,949,421 A | 9/1999 | Ogletree et al. |
| 5,801,720 A | 9/1998 | Norrod et al. | 5,949,423 A | 9/1999 | Olsen |
| 5,805,175 A | 9/1998 | Priem | 5,949,428 A | 9/1999 | Toelle et al. |
| 5,808,619 A | 9/1998 | Choi et al. | 5,956,042 A | 9/1999 | Tucker et al. |
| 5,808,630 A | 9/1998 | Pannell | 5,956,043 A | 9/1999 | Jensen |
| 5,809,219 A | 9/1998 | Pearce et al. | 5,958,020 A | 9/1999 | Evoy et al. |
| 5,809,278 A | 9/1998 | Watanabe et al. | 5,959,640 A | 9/1999 | Rudin et al. |
| 5,815,165 A | 9/1998 | Blixt | 5,963,220 A | 10/1999 | Lee et al. |
| 5,818,456 A | 10/1998 | Cosman et al. | 5,966,134 A | 10/1999 | Arias |
| 5,819,017 A | 10/1998 | Akeley et al. | 5,977,979 A | 11/1999 | Clough et al. |
| 5,821,940 A | 10/1998 | Morgan et al. | 5,977,984 A | 11/1999 | Omori |
| 5,822,516 A | 10/1998 | Krech, Jr. | 5,982,376 A | 11/1999 | Abe et al. |
| 5,828,382 A | 10/1998 | Wilde | 5,982,390 A | 11/1999 | Stoneking et al. |
| 5,828,383 A | 10/1998 | May et al. | 5,986,659 A | 11/1999 | Gallery et al. |
| 5,828,907 A | 10/1998 | Wise et al. | 5,986,663 A | 11/1999 | Wilde |
| 5,831,624 A | 11/1998 | Tarolli et al. | 5,986,677 A | 11/1999 | Jones et al. |
| 5,831,625 A | 11/1998 | Rich et al. | 5,987,567 A | 11/1999 | Rivard et al. |
| 5,831,640 A | 11/1998 | Wang et al. | 5,990,903 A | 11/1999 | Donovan |
| 5,835,096 A | 11/1998 | Baldwin | 5,995,120 A | 11/1999 | Dye |
| 5,835,792 A | 11/1998 | Wise et al. | 5,995,121 A | 11/1999 | Alcokm et al. |
| 5,838,334 A | 11/1998 | Dye | 5,999,189 A | 12/1999 | Kajiya et al. |
| 5,844,576 A | 12/1998 | Wilde et al. | 5,999,198 A | 12/1999 | Horan et al. |
| 5,850,229 A | 12/1998 | Edelsbrunner et al. | 6,002,407 A | 12/1999 | Fadden |
| 5,852,451 A | 12/1998 | Cox et al. | 6,002,410 A | 12/1999 | Battle |
| 5,856,829 A | 1/1999 | Gray, III et al. | 6,005,582 A | 12/1999 | Gabriel et al. |
| 5,859,645 A | 1/1999 | Latham | 6,005,583 A | 12/1999 | Morrison |
| 5,861,888 A | 1/1999 | Dempsey | 6,005,584 A | 12/1999 | Kitamura et al. |
| 5,861,893 A | 1/1999 | Sturgess | 6,007,428 A | 12/1999 | Nishiumi et al. |
| 5,867,166 A | 2/1999 | Myhrvold et al. | 6,008,820 A | 12/1999 | Chauvin et al. |
| 5,870,097 A | 2/1999 | Snyder et al. | 6,011,562 A | 1/2000 | Gagne et al. |
| 5,870,098 A | 2/1999 | Gardiner | 6,011,565 A | 1/2000 | Kuo et al. |
| 5,870,102 A | 2/1999 | Tarolli et al. | 6,014,144 A | 1/2000 | Nelson et al. |
| 5,870,109 A | 2/1999 | McCormack et al. | 6,016,150 A | 1/2000 | Lengyel et al. |
| 5,870,587 A | 2/1999 | Danforth et al. | 6,016,151 A | 1/2000 | Lin |
| 5,872,902 A | 2/1999 | Kuchkuda et al. | 6,018,350 A | 1/2000 | Lee et al. |
| 5,877,741 A | 3/1999 | Chee et al. | 6,020,931 A | 2/2000 | Bilbrey et al. |
| 5,877,770 A | 3/1999 | Hanaoka | 6,021,417 A | 2/2000 | Massarksy |
| 5,877,771 A | 3/1999 | Drebin et al. | 6,022,274 A | 2/2000 | Takeda et al. |
| 5,880,736 A | 3/1999 | Peercy et al. | 6,023,261 A | 2/2000 | Ugajin |
| 5,880,737 A | 3/1999 | Griffin et al. | 6,026,182 A | 2/2000 | Lee et al. |
| 5,883,638 A | 3/1999 | Rouet et al. | 6,028,608 A | 2/2000 | Jenkins |
| 5,886,701 A | 3/1999 | Chauvin et al. | 6,031,542 A | 2/2000 | Wittig |
| 5,886,705 A | 3/1999 | Lentz | 6,035,360 A | 3/2000 | Doidge et al. |
| 5,887,155 A | 3/1999 | Laidig | 6,037,948 A | 3/2000 | Liepa |
| 5,890,190 A | 3/1999 | Rutman | 6,038,031 A | 3/2000 | Murphy |
| 5,892,517 A | 4/1999 | Rich | 6,038,348 A | 3/2000 | Carley |
| 5,892,974 A | 4/1999 | Koizumi et al. | 6,040,843 A | 3/2000 | Monroe et al. |
| 5,894,300 A | 4/1999 | Takizawa | 6,040,844 A | 3/2000 | Yamaguchi et al. |
| 5,900,881 A | 5/1999 | Ikedo | 6,041,010 A | 3/2000 | Puar et al. |
| 5,903,283 A | 5/1999 | Selwan et al. | 6,043,804 A | 3/2000 | Greene |
| 5,909,218 A | 6/1999 | Naka et al. | 6,043,821 A | 3/2000 | Sprague et al. |
| 5,909,225 A | 6/1999 | Schinnerer et al. | 6,046,746 A | 4/2000 | Deering |
| 5,912,675 A | 6/1999 | Laperriere | 6,046,747 A | 4/2000 | Saunders et al. |
| 5,912,676 A | 6/1999 | Malladi et al. | 6,046,752 A | 4/2000 | Kirkland et al. |
| 5,914,721 A | 6/1999 | Lim | 6,049,337 A | 4/2000 | Van Overveld |
| 5,914,725 A | 6/1999 | MacInnis et al. | 6,049,338 A | 4/2000 | Anderson et al. |
| 5,914,729 A | 6/1999 | Lippincott | 6,052,125 A | 4/2000 | Gardiner et al. |
| 5,920,876 A | 7/1999 | Ungar et al. | 6,052,126 A | 4/2000 | Sakuraba et al. |
| 5,923,332 A | 7/1999 | Izawa | 6,052,127 A | 4/2000 | Vaswani et al. |
| 5,923,334 A | 7/1999 | Luken | 6,052,129 A | 4/2000 | Fowler et al. |
| 5,926,182 A | 7/1999 | Menon et al. | 6,052,133 A | 4/2000 | Kang |
| 5,926,647 A | 7/1999 | Adams et al. | 6,054,993 A | 4/2000 | Devic et al. |
| 5,933,150 A | 8/1999 | Ngo et al. | 6,054,999 A | 4/2000 | Strandberg |

| | | | |
|---|---|---|---|
| 6,057,847 A | 5/2000 | Jenkins | |
| 6,057,849 A | 5/2000 | Haubner et al. | |
| 6,057,851 A | 5/2000 | Luken et al. | |
| 6,057,859 A | 5/2000 | Handelman et al. | |
| 6,057,861 A | 5/2000 | Lee et al. | |
| 6,057,862 A | 5/2000 | Margulis | |
| 6,057,863 A | 5/2000 | Olarig | |
| 6,061,462 A | 5/2000 | Tostevin et al. | |
| 6,064,392 A | 5/2000 | Rohner | |
| 6,067,098 A | 5/2000 | Dye | |
| 6,070,204 A | 5/2000 | Poisner | |
| 6,072,496 A | 6/2000 | Guenter et al. | |
| 6,075,543 A | 6/2000 | Akeley | |
| 6,075,546 A | 6/2000 | Hussain et al. | |
| 6,078,311 A | 6/2000 | Pelkey | |
| 6,078,333 A | 6/2000 | Wittig et al. | |
| 6,078,334 A | 6/2000 | Hanaoka et al. | |
| 6,078,338 A | 6/2000 | Horan et al. | |
| 6,081,274 A | 6/2000 | Shiraishi | |
| 6,088,035 A | 7/2000 | Sudarsky et al. | |
| 6,088,042 A | 7/2000 | Handelman et al. | |
| 6,088,487 A | 7/2000 | Kurashige | |
| 6,088,701 A | 7/2000 | Whaley et al. | |
| 6,091,431 A | 7/2000 | Saxena et al. | |
| 6,092,158 A | 7/2000 | Harriman et al. | |
| 6,094,200 A | 7/2000 | Olsen et al. | |
| 6,097,435 A | 8/2000 | Stanger et al. | |
| 6,097,437 A | 8/2000 | Hwang | |
| 6,104,415 A | 8/2000 | Gossett | |
| 6,104,417 A | 8/2000 | Nielsen et al. | |
| 6,105,094 A | 8/2000 | Lindeman | |
| 6,108,743 A | 8/2000 | Debs et al. | |
| 6,111,582 A | 8/2000 | Jenkins | |
| 6,111,584 A | 8/2000 | Murphy | |
| 6,115,047 A | 9/2000 | Deering | |
| 6,115,049 A | 9/2000 | Winner et al. | |
| 6,118,462 A | 9/2000 | Margulis | |
| 6,128,026 A | 10/2000 | Brothers, III | |
| 6,134,374 A * | 10/2000 | Harumatsu et al. | 386/33 |
| 6,144,365 A | 11/2000 | Young et al. | |
| 6,144,387 A | 11/2000 | Liu et al. | |
| 6,151,602 A | 11/2000 | Hejlsberg et al. | |
| 6,155,926 A | 12/2000 | Miyamoto et al. | |
| 6,157,387 A | 12/2000 | Kotani | |
| 6,166,748 A | 12/2000 | Van Hook et al. | |
| 6,172,678 B1 | 1/2001 | Shiraishi | |
| 6,177,944 B1 | 1/2001 | Fowler et al. | |
| 6,191,794 B1 | 2/2001 | Priem et al. | |
| 6,200,253 B1 | 3/2001 | Nishiumi et al. | |
| 6,204,851 B1 | 3/2001 | Netschke et al. | |
| 6,215,496 B1 | 4/2001 | Szeliski et al. | |
| 6,215,497 B1 | 4/2001 | Leung | |
| 6,226,713 B1 | 5/2001 | Mehrotra | |
| 6,232,981 B1 | 5/2001 | Gossett | |
| 6,236,413 B1 | 5/2001 | Gossett et al. | |
| 6,239,810 B1 | 5/2001 | Van Hook et al. | |
| 6,252,608 B1 | 6/2001 | Snyder et al. | |
| 6,252,610 B1 | 6/2001 | Hussain | |
| 6,264,558 B1 | 7/2001 | Nishiumi et al. | |
| 6,268,861 B1 | 7/2001 | Sanz-Pastor et al. | |
| 6,275,235 B1 | 8/2001 | Morgan, III | |
| 6,285,779 B1 | 9/2001 | Lapidous et al. | |
| 6,292,194 B1 | 9/2001 | Powell, III | |
| 6,329,997 B1 | 12/2001 | Wu et al. | |
| 6,331,856 B1 | 12/2001 | Van Hook et al. | |
| 6,339,428 B1 | 1/2002 | Fowler et al. | |
| 6,342,892 B1 | 1/2002 | Van Hook et al. | |
| 6,353,438 B1 | 3/2002 | Van Hook et al. | |
| 6,356,497 B1 | 3/2002 | Puar et al. | |
| 6,408,362 B1 | 6/2002 | Arimilli et al. | |
| 6,417,858 B1 | 7/2002 | Bosch et al. | |
| 6,426,747 B1 | 7/2002 | Hoppe et al. | |
| 6,437,781 B1 | 8/2002 | Tucker et al. | |
| 6,459,429 B1 | 10/2002 | Deering | |
| 6,466,223 B1 | 10/2002 | Dorbie et al. | |
| 6,469,707 B1 | 10/2002 | Voorhies | |
| 6,476,808 B1 | 11/2002 | Kuo et al. | |
| 6,476,822 B1 | 11/2002 | Burbank | |
| 6,496,187 B1 | 12/2002 | Deering et al. | |
| 6,532,018 B1 | 3/2003 | Chen et al. | |
| 6,567,098 B1 * | 5/2003 | D'Amora | 345/611 |
| 6,664,955 B1 | 12/2003 | Deering | |

FOREIGN PATENT DOCUMENTS

| | | |
|---|---|---|
| EP | 0 778 536 | 6/1997 |
| EP | 0 802 519 | 10/1997 |
| JP | 9-330230 | 12/1997 |
| WO | WO/93/04429 | 3/1993 |

OTHER PUBLICATIONS

Technical Presentations: "Texture Space Bump Mapping," Sim Dietrich, Nov. 10, 2000, www.nvidia.com.

Whitepapers: "Texture Addressing," Sim Dietrich, Jan. 6, 2000, www.nvidia.com.

White paper, Huddy, Richard, "The Efficient Use of Vertex Buffers," (Nov. 1, 2000).

White paper, Spitzer, John, et al., "Using GL__NV__array__range and GL__NV__Fence on GEForce Products and Beyond" (Aug. 1, 2000).

White paper, Rogers, Douglas H., "Optimizing Direct3D for the GeForce 256" (Jan. 3, 2000).

Thompson, Tom, "Must-See 3-D Engines," Byte Magazine, printed from web site www.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 1997).

"Howto: Animate Textures in Direct3D Immediate Mode," printed from web site support.microsoft.com, 3 pages (last reviewed Dec. 15, 2000).

Info: Rendering a Triangle Using an Execute Buffer, printed from web site support.microsoft.com, 6 pages (last reviewed Oct. 20, 2000).

U.S. Appl. No. 09/337,293, filed Jun. 21, 1999, Multi-Format Vertex Data Processing Apparatus and Method [issued as U.S. Patent No. 6,501,479 B1 on Dec. 31, 2002].

Datasheet, SGS-Thomson Microelectronics, nVIDIA™, RIVA 128™ 128-Bit 3D Multimedia Accelerator (Oct. 1997).

ZDNet Reviews, from PC Magazine, "Other Enhancements," Jan. 15, 1999, wysiwyg://16/http://www4.zdnet.com...ies/reviews/0,4161,2188286,00.html.

ZDNet Reviews, from PC Magazine, "Screen Shot of Alpha-channel Transparency," Jan. 15, 1999, wysiwyg://16/http://www4.zdnet.com...ies/reviews/0,4161,2188286,00.html.

Blythe, David, 5.6 Transparency Mapping and Trimming with Alpha, http://toolbox.sgi.com/TasteOfDT/d...penGL/advanced98/notes/node41.html, Jun. 11, 1998.

Winner, Stephanie, et al., "Hardware Accelerated Rendering Of Antialiasing Using A Modified A-buffer Algorithm," Computer Graphics Proceedings, Annual Conference Series, 1997, pp. 307-316.

Gibson, Simon, et al., "Interactive Rendering with Real-World Illumination," Rendering Techniques 2000; 11th Eurographics Workshop on Rendering, pp. 365-376 (Jun. 2000).

Segal, Mark, et al., "Fast Shadows and Lighting Effects Using Texture Mapping," Computer Graphics, 26, 2, pp. 249-252 (Jul. 1992).

White paper, Kilgard, Mark J., "Improving Shadows and Reflections via the Stencil Buffer"(Nov. 3, 1999).

Arkin, Alan, email, subject: "Texture distortion problem," from web site: HTTP://reality.sgi.com (Jul. 1997).

Moller, Tomas et al., "Real-Time Rendering," pp. 179-183 (AK Peters Ltd., 1999).

Williams, Lance, "Casting Curved Shadows on Curved Surfaces," Computer Graphics (SIGGRAPH '78 Proceedings), vol. 12, No. 3, pp. 270-274 (Aug. 1978).

Woo et al., "A Survey of Shadow Algorithms," IEEE Computer Graphics and Applications, vol. 10, No. 6, pp. 13-32 (Nov. 1990).

Heidrich et al., "Applications of Pixel Textures in Visualization and Realistic Image Synthesis," Proceedings 1999 Symposium On Interactive 3D Graphics, pp. 127-134 (Apr. 1999).

Hourcade et al, "Algorithms for Antialiased Cast Shadows", Computers and Graphics, vol. 9, No. 3, pp. 260-265 (1985).

Michael McCool, "Shadow Volume Reconstruction from Depth Maps", ACM Transactions on Graphics, vol. 19, No. 1, Jan. 2000, pp. 1-26.

RenderMan Artist Tools, PhotoRealistic RenderMan 3.8 User's Manual, Pixar (Aug. 1998).

RenderMan Interface Version 3.2 (Jul. 2000).

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

Peter J. Kovach, Inside Direct 3D, "Alpha Testing," pp. 289-291 (1999).

Raskar, Ramesh et al., "Image Precision Silhouette Edges," Symposium on Interactive 3D Graphics1999, Atlanta, 7 pages (Apr. 26-29, 1999).

Schlechtweg, Stefan et al., Rendering Line-Drawings with Limited Resources, Proceedings of GRAPHICON '96, 6th International Conference and Exhibition on Computer Graphics and Visualization in Russia, (St. Petersburg, Jul. 1-5, 1996) vol. 2, pp. 131-137.

Haeberli, Paul et al., "Texture Mapping as a Fundamental Drawing Primitive," Proceedings of the Fourth Eurographics Workshop on Rendering, 11pages, Paris, France (Jun. 1993).

Schlechtweg, Stefan et al., "Emphasising in Line-drawings," Norsk samarbeid innen grafisk databehandling: NORSIGD Info, medlemsblad for NORSIGD, Nr 1/95, pp. 9-10.

Feth, Bill, "Non-Photorealistic Rendering," wif3 @ cornell.edu, CS490—Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.-Mar. 1998.

Zeleznik, Robert et al."Sketch: An Interface for Sketching 3D Scenes," Computer Graphics Proceedings, Annual Conference Series 1996, pp. 163-170.

Computer Graphics World, Dec. 1997.

Reynolds, Craig, "Stylized Depiction in Computer Graphics, Non-Photorealistic, Painterly and Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/toolkit/Toolkit/AppNotes/appnote.24.html.

Softimage/3D Full Support, "Toon Assistant," 1998 Avid Technology, Inc., 1 page, http://www.softimage.com/3dsupport/techn...uments/3.8/features3.8/rel_notes.56.html.

The RenderMan Interface Version 3.1, (Sep. 1989).

"Renderman Artist Tools, PhotoRealistic RenderMan Tutorial," Pixar (Jan. 1996).

NVIDIA.com, technical presentation, "AGDC Per-Pixel Shading" (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with the ATI Rage Pro," (7 pages) from ati.com web site (2000).

"Hardware Technology," from ATI.com web site, 8 pages (2000).

"Skeletal Animation and Skinning," from ATI.com web site, 2 pages (Summer 2000).

"Developer Relations, ATI Summer 2000 Developer Newsletter," from ATI.com web site, 5 pages (Summer 2000).

Press Releases, "ATI's RADEON family of products delivers the most comprehensive support for the advance graphics features of DirectX 8.0," Canada, from ATI.com web site, 2 pages (Nov. 8, 2000).

"ATI RADEON Skinning and Tweening," from ATI.com web site, 1 page (2000).

Hart, Evan et al., "Vertex Shadign with Direct3D and OpenGL," Game Developers Conference 2001, from ATI.com web site (2001).

Search Results for: skinning, from ATI.com web site, 5 pages (May 24, 2001).

Hart, Evan et al., "Graphics by rage," Game Developers Conference 2000, from ATI.com web site (2000).

Efficient Command/Data Interface Protocol For Graphics, IBM TDB, vol. 36, issue 9A, Sep. 1, 1993, pp. 307-312.

Shade, Jonathan et al., "Layered Depth Images," Computer Graphics Proceedings, Annual Conference Series, pp. 231-242 (1998).

Hoppe, Hugues, "Optimization of Mesh Locality for Transparent Vertex Caching," Proceedings of SIGGRAPH, pp. 269-276 (Aug. 8-13, 1999).

Whitepaper: Implementing Fog in Direct3D, Jan. 3, 2000, www.nvidia.com.

Akeley, Kurt, "Reality Engine Graphics", 1993, Silicon Graphics Computer Systems, pp. 109-116.

* cited by examiner

Fig. 5 EXAMPLE GRAPHICS PROCESSOR FLOW

Fig. 6
(Embedded Frame Buffer (EFB))
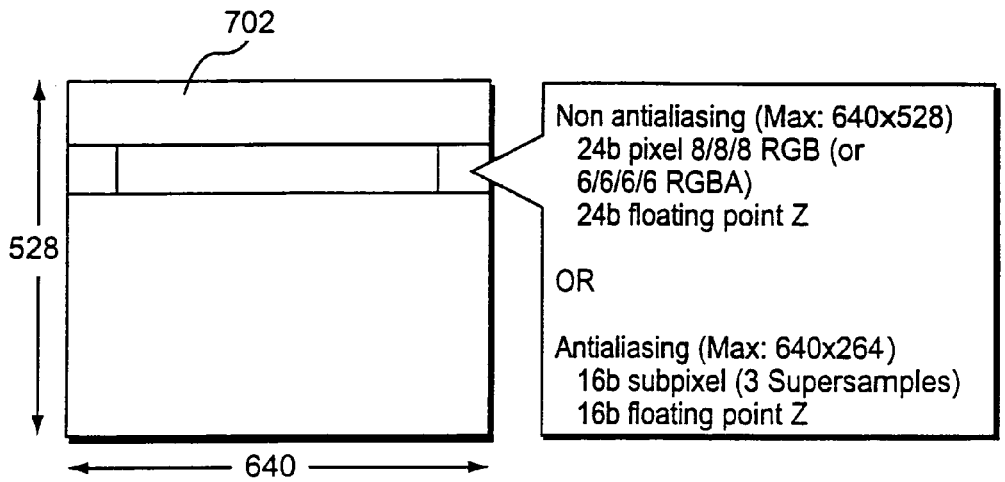
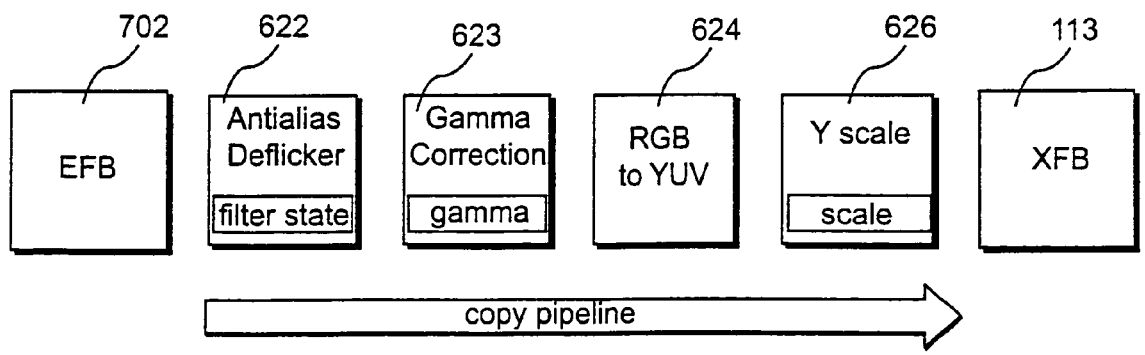
Fig. 9

(Embedded Frame Buffer Organization)

(Pixel Engine/Frame Buffer Interface)

$U(i) = 1/4 * U(i-1) + 1/2 * U(i) + 1/4 * U(i+1)$ $V(i) = 1/4 * V(i-1) + 1/2 * V(i) + 1/4 * V(i+1)$ (RGB to YUV Conversion)

(Vertial Scaling)

(Copy pipeline)

(Vertical Filter Blending)
(Programmable 7-tap filter)

(AA buffering)

Example de-flickering filter (De-flicker buffering)

(YCbCr 4:4:4 to 4:2:2 down sampling)

(YCbCr 4:2:0 to YCbCr 4:2:2 up-sampling)

(YCbCr 4:2:2 to YCbCr 4:4:4 up-sampling)

- Pixel
- ○ Chroma Sample (Control Register)

Fig. 16
(Texture Copy Command)
0x52:copy_cmd (texture) pixtypes allowed: rgb8, rgba6, rgb_aa,z,yuv8,yuv420:
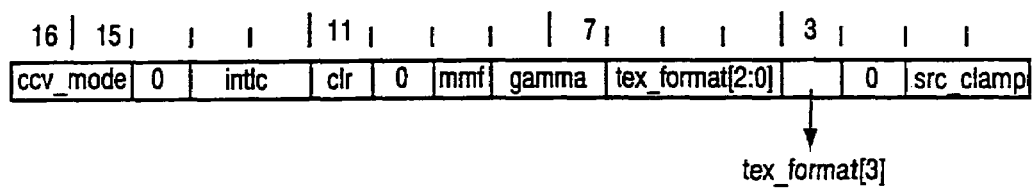
0x52:copy_cmd (display) pixtypes allowed:
rgb8, rgba6, rgb_aa,yuv420:
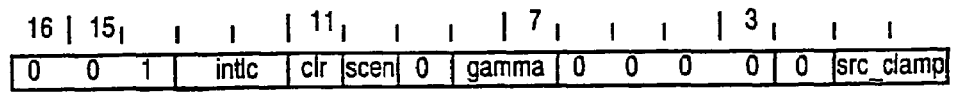
Fig. 17
(Display Copy Command)

GRAPHICS SYSTEM WITH EMBEDDED FRAME BUTTER HAVING RECONFIGURABLE PIXEL FORMATS

CROSS-REFERENCE TO RELATED APPLICATIONS

This application is a continuation of U.S. application Ser. No. 11/082,854, filed Mar. 18, 2005 now U.S. Pat. No. 7,075,545, is a continuation of U.S. application Ser. No. 09/722,380, filed Nov. 28, 2000 now U.S. Pat. No. 6,937,245, which was filed in accordance with 35 U.S.C. §119(e)(1) and claims the benefit of the provisional application Ser. No. 60/226,910 filed on Aug. 23, 2000, entitled "Graphics System With Embedded Frame Buffer Having Reconfigurable Pixel Formats."

This application is related to the following co-pending applications identified below, which focus on various aspects of the graphics system described herein. Each of the following applications are hereby incorporated herein by reference.

provisional Application No. 60/161,915, filed Oct. 28, 1999 and its corresponding utility application Ser. No. 09/465,754, filed Dec. 17, 1999, both entitled "Vertex Cache For 3D Computer Graphics", provisional Application No. 60/226,912, filed Aug. 23, 2000 and its corresponding utility application Ser. No. 09/726,215, filed Nov. 28, 2000, both entitled "Method and Apparatus for Buffering Graphics Data in a Graphics System", provisional Application No. 60/226,889, filed Aug. 23, 2000 and its corresponding utility application Ser. No. 09/722,419, filed Nov. 28, 2000, both entitled "Graphics Pipeline Token Synchronization", provisional Application No. 60/226,891, filed Aug. 23, 2000 and its corresponding utility application Ser. No. 09/722,382, filed Nov. 28, 2000, both entitled "Method And Apparatus For Direct and Indirect Texture Processing In A Graphics System", provisional Application No. 60/226,888, filed Aug. 23, 2000 and its corresponding utility application Ser. No. 09/722,367, filed Nov. 28, 2000, both entitled "Recirculating Shade Tree Blender For A Graphics System", provisional Application No. 60/226,892, filed Aug. 23, 2000 and its corresponding utility application Ser. No. 09/726,218, filed Nov. 28, 2000, both entitled "Method And Apparatus For Efficient Generation Of Texture Coordinate Displacements For Implementing Emboss-Style Bump Mapping In A Graphics Rendering System", provisional Application No. 60/226,893, filed Aug. 23, 2000 and its corresponding utility application Ser. No. 09/722,381 filed Nov. 28, 2000, both entitled "Method And Apparatus For Environment-Mapped Bump-Mapping In A Graphics System", provisional Application No. 60/227,007, filed Aug. 23, 2000 and its corresponding utility application Ser. No. 09/726,216, filed Nov. 28, 2000, both entitled "Achromatic Lighting in a Graphics System and Method", provisional Application No. 60/226,900, filed Aug. 23, 2000 and its corresponding utility application Ser. No. 09/726,226, filed Nov. 28, 2000, both entitled "Method And Apparatus For Anti-Aliasing In A Graphics System", utility application Ser. No. 09/585,329, filed Jun. 2, 2000, entitled "Variable Bit Field Color Encoding", provisional Application No. 60/226,890, filed Aug. 23, 2000 and its corresponding utility application Ser. No. 09/726,227, filed Nov. 28, 2000, both entitled "Method And Apparatus For Dynamically Reconfiguring The Order Of Hidden Surface Processing Based On Rendering Mode", provisional Application No. 60/226,915, filed Aug. 23, 2000 and its corresponding utility application Ser. No. 09/726,212 filed Nov. 28, 2000, both entitled "Method And Apparatus For Providing Non-Photorealistic Cartoon Outlining Within A Graphics System", provisional Application No. 60/227,032, filed Aug. 23, 2000 and its corresponding utility application Ser. No. 09/726,225, filed Nov. 28, 2000, both entitled "Method And Apparatus For Providing Improved Fog Effects In A Graphics System", provisional Application No. 60/226,885, filed Aug. 23, 2000 and its corresponding utility application Ser. No. 09/722,664, filed Nov. 28, 2000, both entitled "Controller Interface For A Graphics System", provisional Application No. 60/227,033, filed Aug. 23, 2000 and its corresponding utility application Ser. No. 09/726,221, filed Nov. 28, 2000, both entitled "Method And Apparatus For Texture Tiling In A Graphics System", provisional Application No. 60/226,899, filed Aug. 23, 2000 and its corresponding utility application Ser. No. 09/722,667, filed Nov. 28, 2000, both entitled "Method And Apparatus For Pre-Caching Data In Audio Memory", provisional Application No. 60/226,913, filed Aug. 23, 2000 and its corresponding utility application Ser. No. 09/722,378, filed Nov. 28, 2000, both entitled "Z-Texturing", provisional Application No. 60/227,031, filed Aug. 23, 2000 entitled "Application Program Interface for a Graphics System"

provisional Application No. 60/227,030, filed Aug. 23, 2000 and its corresponding utility application Ser. No. 09/722,663, filed Nov. 28, 2000, both entitled "Graphics System With Copy Out Conversions Between Embedded Frame Buffer And Main Memory", provisional Application No. 60/226,886, filed Aug. 23, 2000 and its corresponding utility application Ser. No. 09/722,665, filed Nov. 28, 2000, both entitled "Method and Apparatus for Accessing Shared Resources", provisional Application No. 60/226,894, filed Aug. 23, 2000 and its corresponding utility application Ser. No. 09/726,220, filed Nov. 28, 2000, both entitled "Graphics Processing System With Enhanced Memory Controller", provisional Application No. 60/226,914, filed Aug. 23, 2000 and its corresponding utility application Ser. No. 09/722,390, filed Nov. 28, 2000, both entitled "Low Cost Graphics System With Stitching Hardware Support For Skeletal Animation", and provisional Application No. 60/227,006, filed Aug. 23, 2000 and its corresponding utility application Ser. No. 09/722,421, filed Nov. 28, 2000, both entitled "Shadow Mapping In A Low Cost Graphics System".

FIELD OF THE INVENTION

The present invention relates to computer graphics, and more particularly to interactive graphics systems such as home video game platforms. Still more particularly this invention relates to a graphics system having a reconfigurable embedded frame buffer which advantageously enables the selection of particular pixel formats on a frame-by-frame basis for data stored therein.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

A problem graphics system designers confronted in the past was to provide a powerful yet inexpensive system which enables various data formats to be stored and processed thereby in a efficient and advantageous manner. Graphics chips used in graphics systems have included a local or on-chip memory for storing data as it is rendered by the graphics pipeline. When data is generated by the graphics chip it is transferred from the local memory to an external memory, where it can be used by, for example, a video interface unit to display the data on a display device. This external memory is typically part of the main memory of the graphics system and is referred to as the external frame buffer (XFB). The processing path of the data between the local memory and the external frame buffer may be referred to as the copy pipeline.

The local memory and the external frame buffer can have a variety of data formats for achieving various functionality in the graphics system. One problem that graphics system designers have faced in the past is to determine what format(s) of data to support in the local memory and the external frame buffer to enable advantageous and efficient use thereof by applications running on the system. Various solutions to this problem were offered. For example, graphics systems have used a variety of data formats in an attempt to improve or maximize the overall operation of the system. While some work has been done in the past in connection with such memories and data formats, further improvements are desirable. Specifically, further improvements are desired for high performance, low cost graphics systems, such as home video game systems.

The present invention addresses this problem by providing techniques and arrangements for use in connection with an embedded frame buffers in graphics systems. The invention provides a combination of pixel formats for an embedded frame buffer that is particularly advantageous when used in systems designed for playing interactive 3D video games. The invention enables the embedded frame buffer to be reconfigured to and efficiently used in a variety of modes, including an anti-aliasing mode, a deflicker mode and a YUV (i.e. luma/chroma) mode, thereby increasing the flexibility of the system to support a variety of applications. The desired pixel format for each mode can be selected using, for example, a command to the graphics hardware on which the embedded frame buffer is provided.

In accordance with the invention, the copy pipeline is advantageously used to further process the data from the embedded frame buffer prior to storing the data in the external frame buffer. For example, the copy pipeline can be used to convert the data between a variety of useful formats to, for example, reduce the amount of memory needed to store the data, and/or provide the data in desired format for use in further processing by the graphics system. The copy pipeline can also be used to further process the frame data in a manner that improves the display quality and/or modifies the display characteristics.

In accordance with one aspect provided by the invention, the graphics processor includes pixel processing circuitry for producing pixel data, and an embedded frame buffer which receives pixel data, wherein the embedded frame buffer is selectively configurable to store the received pixel data in any of the following formats:

RGB color and depth (Z);

super-sampled RGB color and depth (Z); and

YUV (luma/chroma).

In accordance with a preferred embodiment of the invention, the RGB color and depth is a 48-bit format which includes 24 color bits and 24 depth (Z) bits. The embedded frame buffer is further configurable such that the 24 color bits selectively include either 8 bits for red, 8 bits for blue and 8 bits for green (RGB8) or 6 bits for red, 6 bits for green, 6 bits for blue and 6 bits for alpha (RGBA6). Preferably, super-sampled RGB color and depth is a 96-bit format which includes 16 bit color and 16 bit depth data for three super-sample locations for each pixel. The 16 bit super-sample color data preferably includes 5 bits for red, 6 bits for green and 5 bits for blue (R5G6B5). The YUV format is preferably a YUV 4:2:0 format. The embedded frame buffer (EFB) may be a dynamic random access memory (DRAM). In one embodiment of the invention the EFB is a 1T SRAM, such as provided by Moses, which is a DRAM that acts as an SRAM.

In accordance with another aspect of the invention, a method of using an embedded frame buffer in a graphics system is provided. The method includes providing an embedded frame buffer that is selectively configurable to store point sampled pixel data including color and Z, super-sampled pixel data including color and Z, and YUV format data, and providing an interface, such one or more API commands, to the graphics system which enables the particular configuration of the embedded frame buffer to be established by a programmer on a frame-by-frame basis.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 6 shows an exemplary embedded frame buffer and two RGB based formats used herein;

FIG. 9 shows an exemplary block diagram of the copy pipeline;

FIG. 16 shows an exemplary register used in connection with a texture copy command; and FIG. 17 shows an exemplary register used in connection with a display copy command.

DETAILED DESCRIPTION OF EXAMPLE EMBODIMENTS OF THE INVENTION

Figure 1:
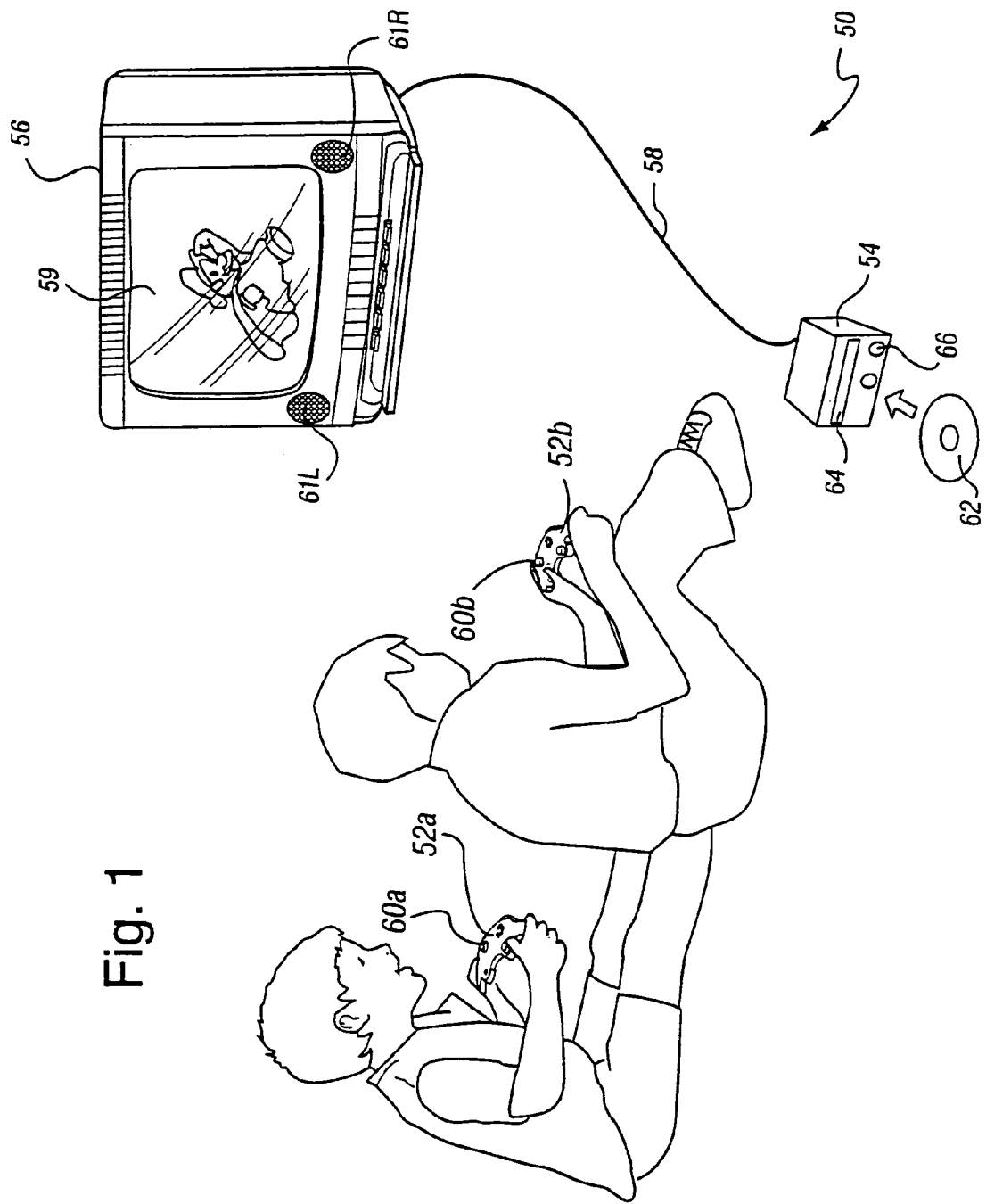
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
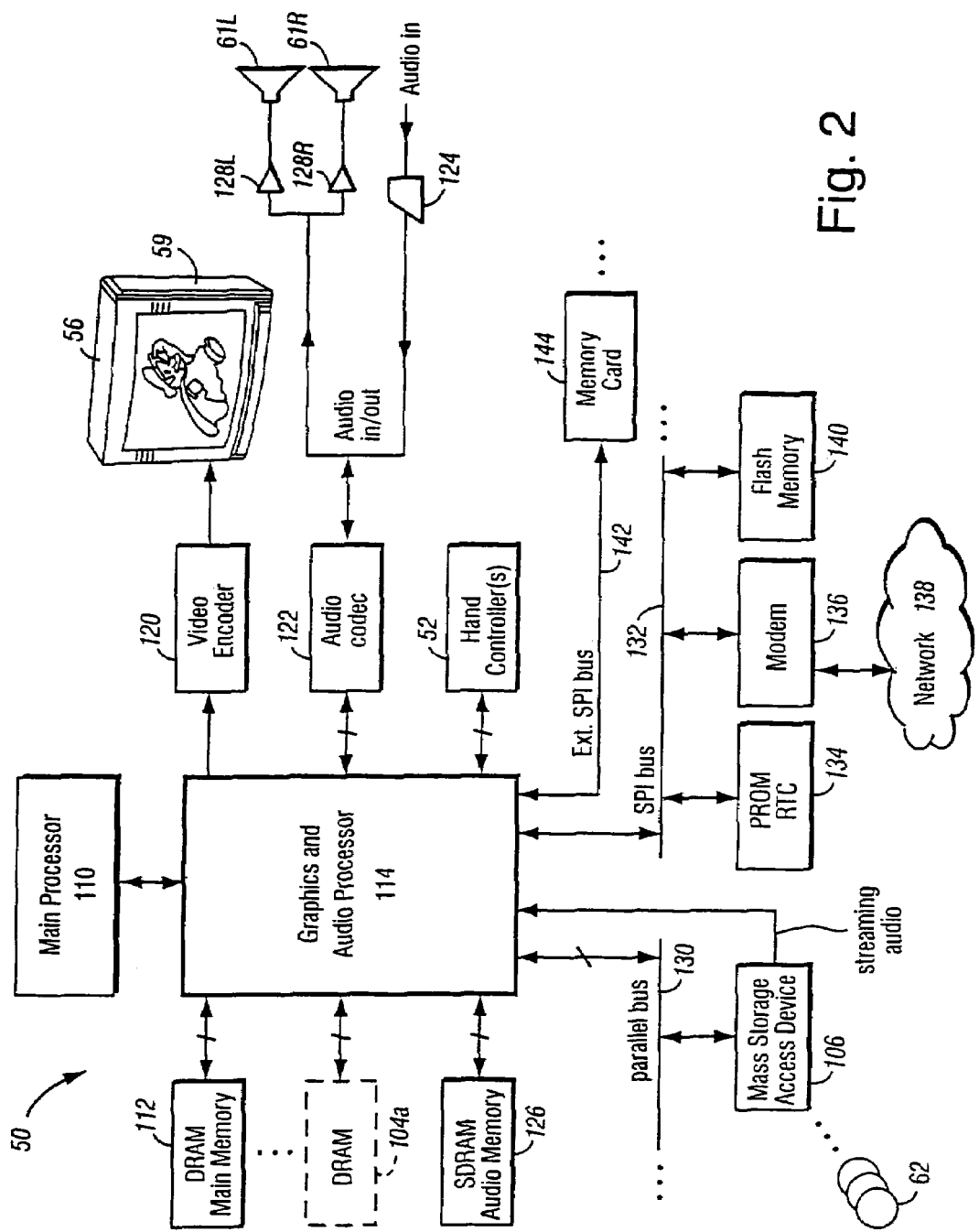
FIG. 2 is a block diagram of the FIG. 1 example computer graphics system.

FIG. 2 shows a block diagram of example components of system 50. The primary components include:

a main processor (CPU) 110, a main memory 112, and a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

- a programmable read-only memory and/or real time clock 134,
- a modem 136 or other networking interface (which may in turn connect system 50 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
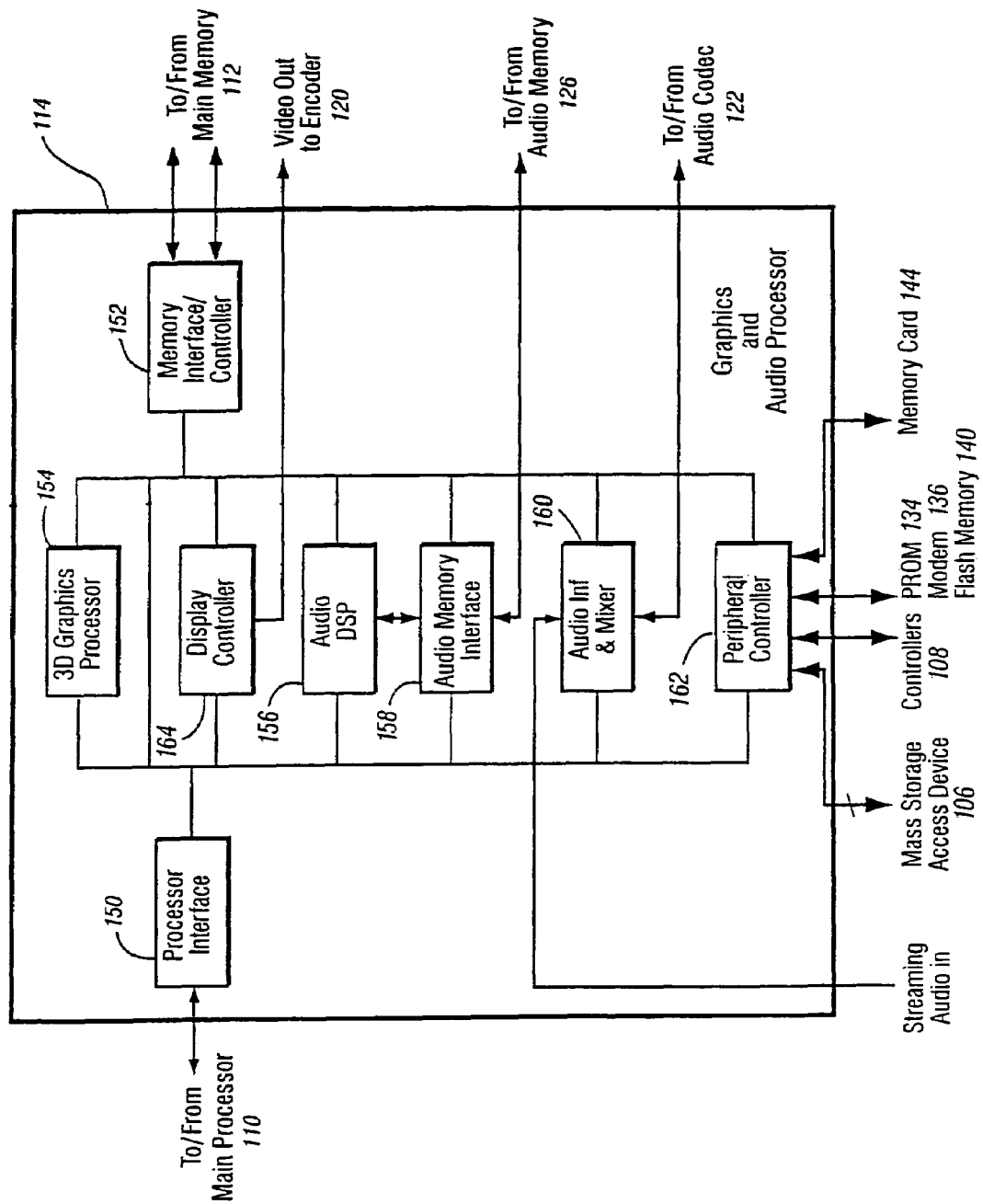
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

- a processor interface 150,
- a memory interface/controller 152,
- a 3D graphics processor 154,
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
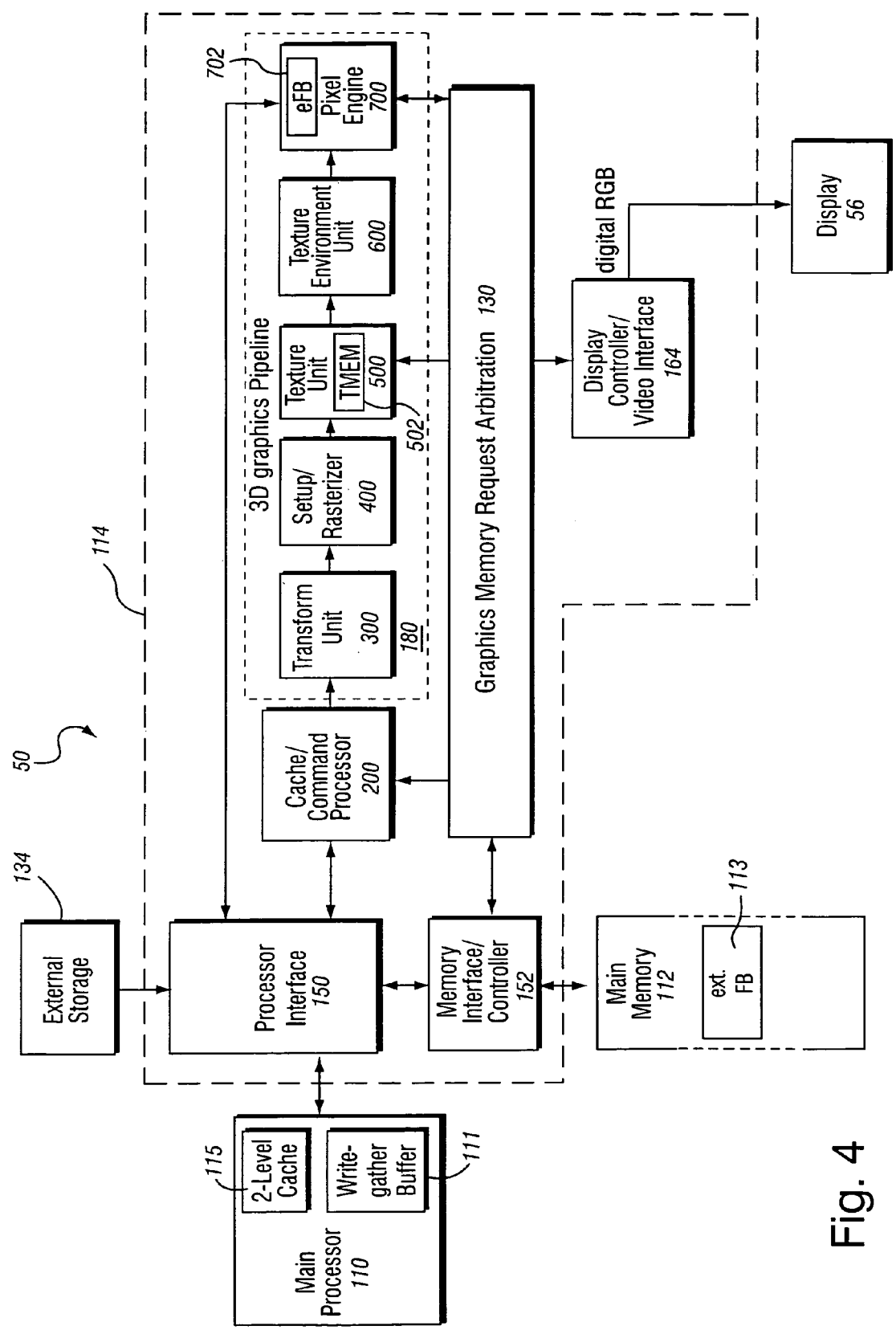
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

Figure 5:
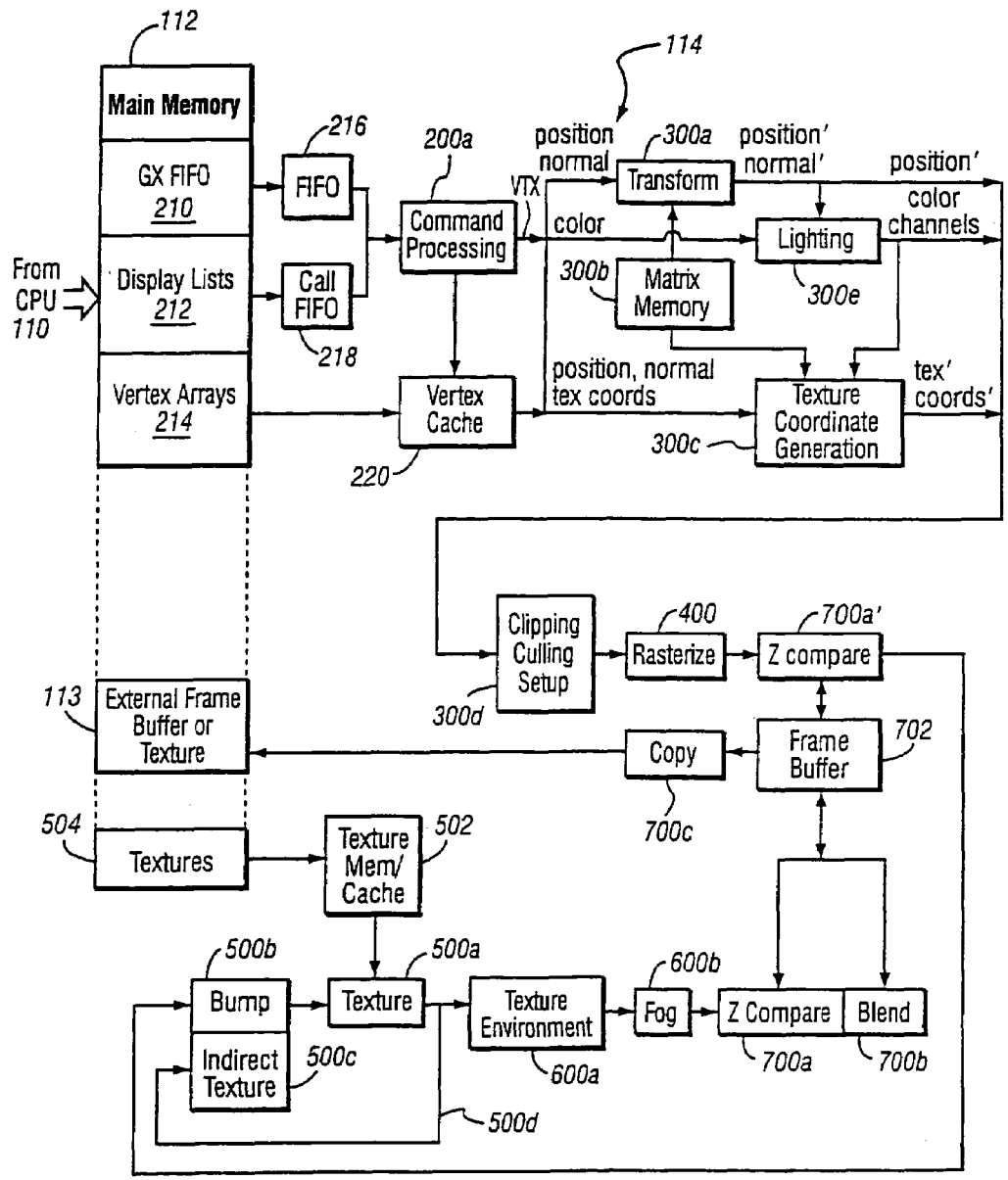
FIG. 5 is an example logical flow diagram of the FIG. 4 graphics and audio processor.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

- command streams from main memory 112 via an on-chip FIFO memory buffer 216 that receives and buffers the graphics commands for synchronization/flow control and load balancing,
- display lists 212 from main memory 112 via an on-chip call FIFO memory buffer 218, and
- vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

- a transform unit 300,
- a setup/rasterizer 400,
- a texture unit 500, a texture environment unit 600, and a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500a) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500b), and indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha testing is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Example Configurations for the Embedded Frame Buffer

As generally shown in FIG. 4, the embedded frame buffer 702 receives data from the graphics pipeline 180. The graphics pipeline renders primitives in RGB(A) format. Thus, as will be explained in more detail below, the embedded frame buffer 702 can be configured to store pixel data in various RGB(A) formats. As can be seen in FIG. 4, the processor interface 150 can be used, not only to supply data to the graphics pipeline 180, but also to enable the main processor (CPU) 110 to load data directly into the embedded frame buffer. This direct loading of the embedded frame buffer by the CPU enables pixel formats other than RGB-type formats to be sent to the embedded frame buffer, thereby increasing the flexibility of the system to support a variety of applications. Specifically, the processor interface 150 enables the main processor 110 to load pixel data in YUV format (i.e. luma/chroma format) into the embedded frame buffer from, for example, an optical disk or other storage media. Once YUV format data is in the embedded frame buffer, it can be copied out to main memory in various texture formats, using the copy pipeline, for use as a texture by the texture environment unit (TEV) during a later rendering process. Thus, in accordance with the instant invention, the embedded frame buffer is reconfigurable between various RGB(A) formats and a YUV format. Each of these formats will be described in detail below.

Example RGB(A) Formats for the Embedded Frame Buffer

In this example, the embedded frame buffer (EFB) has a memory capacity of approximately 2 MB. The maximum pixel width and height of the frame buffer is determined by the size of each pixel. In accordance with the invention, and as shown in FIG. 6, there are two different RGB pixel sizes that can be used for data in the embedded frame buffer 702. These sizes are:

48-bit color and Z; and 96-bit super-sampled color and Z

48-Bit Pixel Size Configuration

The 48-bit format for the embedded frame buffer (EFB) is preferably intended for non-anti-aliasing, and has the following features:

24-bit color (either 8/8/8 with no alpha, or 6/6/6/6 with 6 bits of alpha)

24-bit Z.

In this non-anti-aliasing mode, the 48-bit format can, in this example, support a maximum resolution of 640×528. Thus, the width must be between 0-640 and the EFB stride is fixed at 640 pixels. This non-antaliasing mode is based on a single point sample within each pixel. As indicated above, the point sample of each pixel is given a 24-bit color value and a 24-bit Z value. The color value may have 8 bits each for red, green and blue values when no alpha is used, or it may have 6 bits each for red, green, blue and alpha.

96-Bit Pixel Size Configuration

The 96-bit super-sampling pixel format is preferably used for anti-aliasing and has the following features:

3 samples of 16-bit color (5 bits of Red, 6 bits of Green, 5 bits of Blue, no alpha)

3 samples of 16-bit Z (depth).

This 96-bit format can support a maximum resolution of 640×264. The width is preferably between 0-640 and the stride is fixed at 640.

In this example, the 96-bit format is used for anti-aliasing. However, this format may be used to achieve functionality other than anti-aliasing where three supersamples per pixel are desired. In other words, the 96-bit format provides the ability to store three samples (super-samples) for each pixel, as opposed to the single point sample per pixel as used in the 48-bit configuration.

As can be seen from the above, there are inherent tradeoffs between the 48-bit and 96-bit pixel formats. While the 96-bit anti-aliasing format enables an increase visual quality on the polygon edges and intersections, it does cost performance and Z quality. The 96 bit super-sampling EFB format requires twice as much memory as 48-bit point sampled pixels. This mode also reduces Z buffering precision to 16 bits rather than 24 bits in other formats. In this example, anti-aliasing also reduces peak fill rate from 800 Mpixels/s to 400 Mpixels/s. However, if more than one stage is employed in the texture environment unit (TEV), this reduction is hidden, in that, in this example, using two TEV stages also reduces the fill rate to 400 Mpixels/s.

In one embodiment, the rendering rate with anti-aliasing activated drops down to two pixels/clock due to the embedded frame buffer 702 bandwidth limitations. However, if two or more textures are turned on, the rate at which pixel quads are sent to the pixel engine 700 drops down to less than or equal to one pixel quad every two clocks in this particular embodiment. In this case, turning on anti-aliasing will not impact fill rate. Thus, if a particular scene is geometry-limited, then anti-aliasing will not adversely impact rendering performance. On the other hand, if a particular scene is fill-limited, rendering performance may be substantially adversely impacted by activating anti-aliasing as opposed to using the point sampled mode. The same application can activate and deactivate anti-aliasing for different scenes and different images depending on whether the scenes or images are geometry-limited or fill-limited—or depending upon the image quality required in a particular scene or image. The ability to dynamically change the pixel format in the frame buffer to, for example, activate and deactivate anti-aliasing, on a frame-by-frame basis provides great flexibility in allowing an application programmer to make tradeoffs between image quality and speed performance.

Anti-Aliasing Using the 96-Bit Configuration

The particular and preferred anti-aliasing methods and arrangements for use in connection with the instant invention are disclosed in commonly owned and co-pending application Ser. No. 09/726,226, filed Nov. 28, 2000 and entitled "Method and Apparatus For Anti-Aliasing In A Graphics System", which is incorporated by reference herein in its entirety. A brief explanation of this anti-aliasing is provided below, in order to give a more complete understanding of the 96-bit pixel format for the embedded frame buffer.

In accordance with the anti-aliasing embodiment, anti-aliasing is performed in two main phases. In the first phase, data is loaded into the embedded frame buffer using three supersamples per pixel and the 96-bit pixel EFB format. In the second phase the data is read (or copied out) from the embedded frame buffer and further processed by the copy pipeline. The 96-bit format is particularly advantageous for achieving the first phase of anti-aliasing, however, it can be used for any other suitable purpose as well.

In this example anti-aliasing use of the 96-bit format, the first anti-aliasing phase occurs when the rasterizer is performing edge rasterization into the embedded frame buffer (EFB) 702. Preferably, this rasterizer is an edge and z rasterizer which generates x, y, z and coverage mask values for programmable super-sample locations within every visible pixel quad contained by the current triangle or other primitive being rendered. The pixel quads have three programmable subpixel locations within each pixel. The pixel quad includes 4 pixels in a 2×2 configuration. Within each pixel in the quad, three super-sample locations are programmably selected and specified. Preferably, the programmer can set the subsample locations by writing global registers. Since the location of each of the super-samples in each pixel is programmable in the example embodiment, the particular sampling locations for each quad can be changed as desired for the particular application. On the other hand, in alternative embodiments, a particularly optimal multisample location values could be fixed (e.g., set in hardware) so the application programmer does not need to worry about it. Thus, while the locations are programmable in the example embodiment, a hardwired optional pattern could be used in lieu of programmability. Whatever pattern is selected, it can be repeated across a certain number of neighboring pixels in a frame.

Once all of the primitives have been rendered for a frame, the embedded frame buffer will contain super-sampled pixel information for an entire frame. Due to the fact that three supersamples are provided for each pixel, and each sample includes 16 bit color values and a 16 bit z value, each pixel is represented by 96-bits in the embedded frame buffer. The embedded frame buffer is then ready for use by the copy pipeline, wherein the second phase of anti-aliasing can be performed. This second phase will be described in more detail below in connection with the copy pipeline. Further details regarding anti-aliasing are provided in the co-pending applications identified above.

YUV Embedded Frame Buffer Configuration

Figure 7:
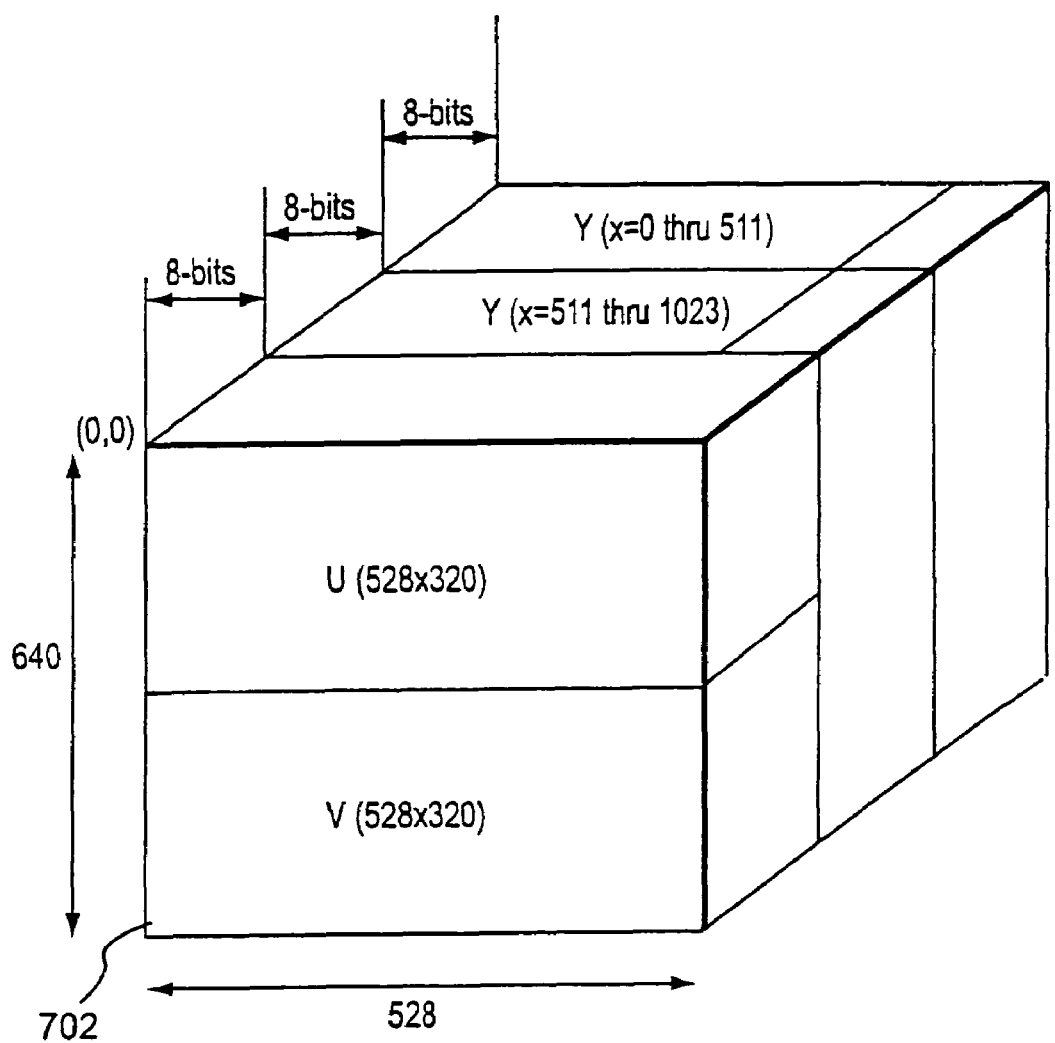
FIG. 7 shows the exemplary frame buffer of FIG. 6 reconfigured to store YUV formatted data.

FIG. 7 shows a further configuration for the embedded frame buffer 702 which is designed to store pixel data in YUV (luma/chroma) format which, for example, enables motion compensation under the MPEG standards (e.g. MPEG2) to be supported by the system. In this YUV configuration, the color buffer is preferably partitioned to store Y (720×576), U (360× 288) and V (360×288) image planes for a YUV 4:2:0 frame. The partitioning of the color buffer preferably allocates as follows:

1024×640 8 bit Y image;

528×320 8 bit U image; and

528×320 8 bit V image.

The preferred location of the images are shown in FIG. 7. The YUV data is preferably loaded into the embedded frame buffer by the main processor from an externally supplied medium, such as an optical disk or the like, or from any other suitable source other than the graphics pipe. It is noted that the graphics pipeline can render single component Y or U or V images, but it cannot draw 3 component YUV pixels. As will be explained in detail below, the YUV data in the embedded frame buffer can be further processed by the copy pipeline to either display the data or to convert the data to texture data for subsequent use by the graphics pipeline.

Example Pixel Format Command

As explained above, the embedded frame buffer 702 can be selectively configured to support two RGB(A) pixel formats (48-bit and 96-bit) and a YUV format. The desired pixel format can preferably be set on a frame-by-frame basis using the API. An example API function for this purpose is as follows:

GXSetPixelFormat:

Argument:

| GXPixelFormats | Format | //Sets pixel format for frame buffer |
| GXZCmprFormats | ZCmpr | //Sets compression format for 16 bit z |
| GXBool | Ztop | //Z compare before texture |

This function sets the format of the embedded frame buffer. The function is called before any drawing operations are performed. The pixel format cannot be changed in the middle of a frame in the example embodiment. The 16 bit Z values (in multisample or anti-aliasing mode) can be uncompressed or compressed. The compressed values give a better precision and range. The Ztop flag can be used to perform depth comparisons before texture mapping (Z-before-texture). This can improves the texture bandwidth because less texels need to be fetched and filtered.

Interface Between the Pixel Engine and the Embedded Frame Buffer

Figure 8:
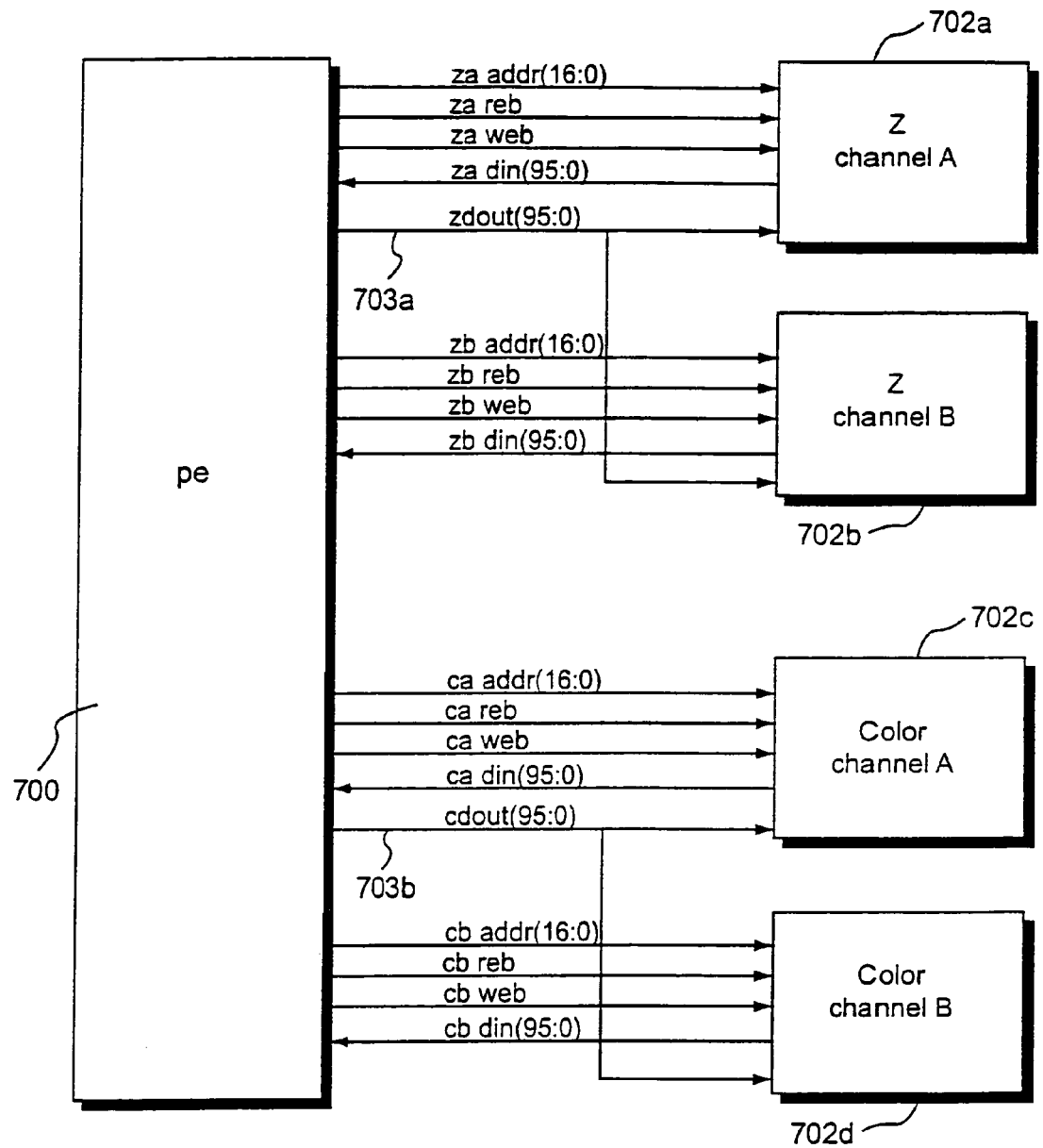
FIG. 8 shows an exemplary interface between the pixel engine and the embedded frame buffer.

An exemplary interface between the pixel engine 700 and the embedded frame buffer 702 is shown in FIG. 8. Preferably, as shown in FIG. 8, there are 4 copies of the embedded frame buffer (702a, 702b, 702c and 702d)—2 for color and 2 for Z. In this example, a read or write access to the embedded frame buffer from the pixel engine transfers 96 bits of data or 4 quads of color and Z. There are 4 address/control and read buses to the core of each of the buffers. The Z channels A and B preferably share a write port 703a, and the color channels A and B preferably share a separate write port 703b. The embedded frame buffer preferably has enough bandwidth to blend 4 pixels per clock for peak fillrate of 800M pixels per second. The maximum size of the embedded frame buffer is 640 ×528×24b color and 24b Z. The embedded frame buffer is single-buffered and expected to transfer a finished image to the external frame buffer for display. Double buffered display is achieved in this manner. The address/control, read and write buses shown in FIG. 8 are defined in the following table:

| Name: | Description: |
| --- | --- |
| za_addr (16:0) | Z channel A quad address. There are 3 subfields:<br>3:0 column(3:0) valid range is 0 to 9<br>10:4 row(7:0) valid range 0 to 127<br>16:11 bank(5:0) valid range is 0 to 32 |
| za_reb | Z change A read enable (active low). |
| za_web | Z channel A write enable (active low). |
| za_din(95:0) | Z channel A quad read bus. 4 × 24 bit Z for a quad.<br>(23:0) Z for the upper left pixel in the quad<br>(47:24) Z for the upper right pixel in the quad<br>(63:48) Z for the lower left pixel in the quad<br>(95:64) Z for the lower right pixel in the quad |
| zdout (95:0) | Z channels A and B quad Z write bus. 4 × 24 bit Z for the quad<br>Refer to za_din for pixel locations on the bus |
| zb_addr (16:0) | Z channel B quad address (refer to za_addr for bit-fields) |
| zb_reb | Z channel B read enable (active low) |
| zb_web | Z channel B write enable (active low) |
| zb_din (95:0) | Z channel B quad read bus (refer to za_din for pixel locations) |
| ca_addr (16:0) | C channel A quad address. There are 3 subfields:<br>3:0 column(3:0) valid range is 0 to 9<br>10:4 row(7:0) valid range 0 to 127<br>16:11 bank(5:0) valid range is 0 to 32 |
| ca_reb | Color channel A read enable (active low) |
| ca_web | Color channel A write enable (active low) |
| ca_din (95:0) | Color channel A quad read bus. 4 × 24 bit color for a quad.<br>(23:0) color for the upper left pixel in the quad<br>(47:24) color for the upper right pixel in the quad<br>(63:48) color for the lower left pixel in the quad<br>(95:64) color for the lower right pixel in the quad |
| Cdout (95:0) | Color channels A and B quad color write bus.<br>4 × 24 bit color for the quad<br>Refer to ca_din for pixel locations on the bus. |
| cb_addr (16:0) | Color channel B quad address (refer to ca_addr for bit-fields) |
| cb_reb | Color channel B read enable (active low) |
| cb_web | Color channel B write enable (active low) |
| cb_din (95:0) | Color channel B quad read bus (refer to ca_din for pixel locations) |

Example Copy Out Operations and Pipeline

Figure 11:
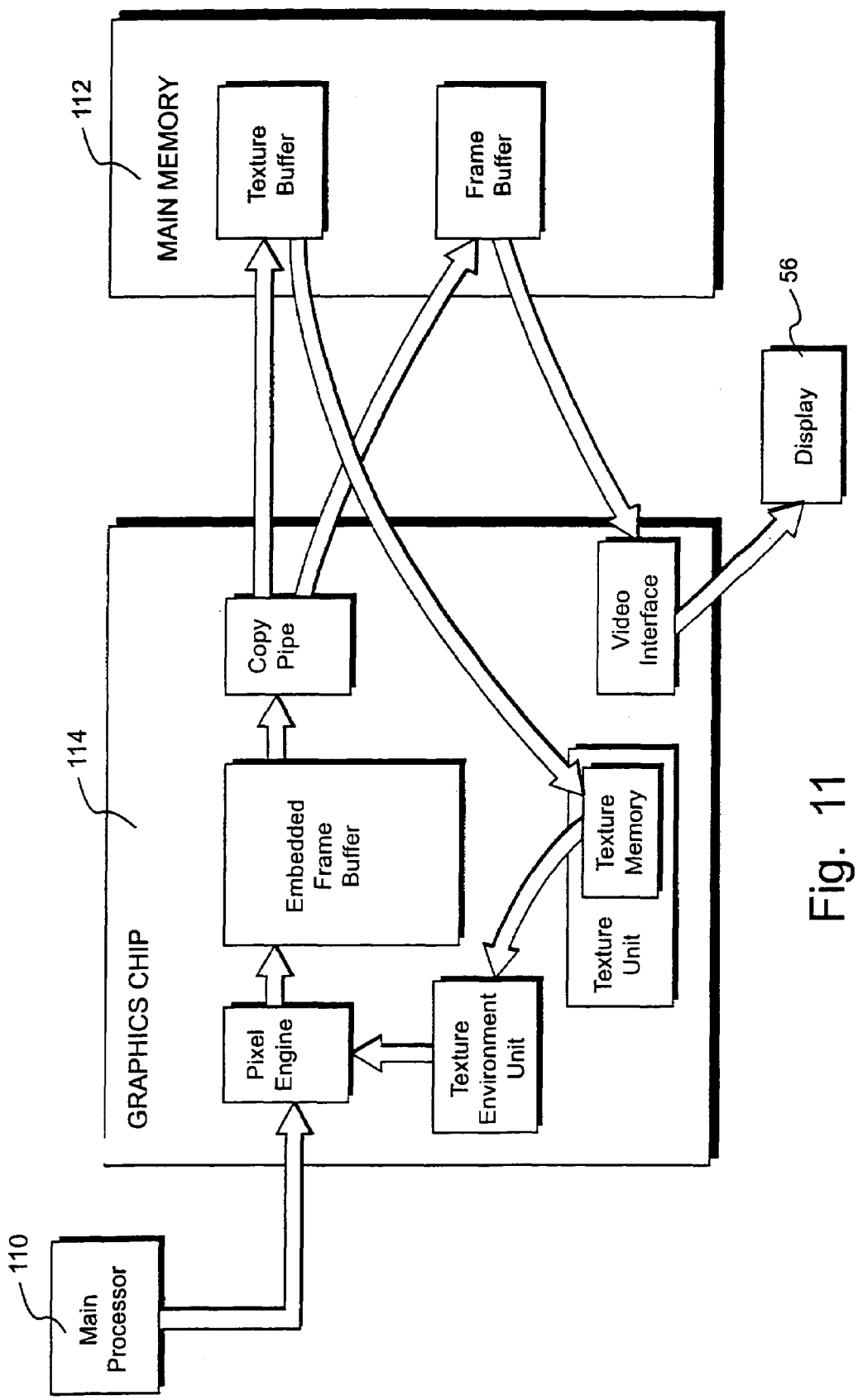
FIG. 11 is a block diagram of the graphics system showing how data moves between the various elements of the system.

Copy out operations, implemented in this example through what is referred to as the copy pipeline, is used to further process the pixel data from the embedded frame buffer (EFB) and to ultimately write the frame data in a selected format into the external frame buffer (XFB) 113 of main memory 112 as display data for display by the video interface or as texture data for later use by the graphics pipeline (see FIG. 11). RGB(A) or YUV420 data in the EFB can be copied out to main memory YUV422, fields or frames. YUV422 data is copied out in scan-line order. There is a stride to allow skipping memory bytes between scan lines. Y8 is the lowest address, followed by U8, Y8 and V8. Copying in YUV format reduces the amount of memory used in main memory by ⅓.

A general block diagram of the copy pipeline, as it mainly relates to the processing of data from the EFB when in either of the two RGB(A) pixel configurations, is shown in FIG. 9. As shown in FIG. 9, this aspect of the copy pipeline includes an anti-alias/deflicker section 622, a gamma correction section 623, an RGB to YUV conversion section 624, and a Y scale section 626.

Figure 12:
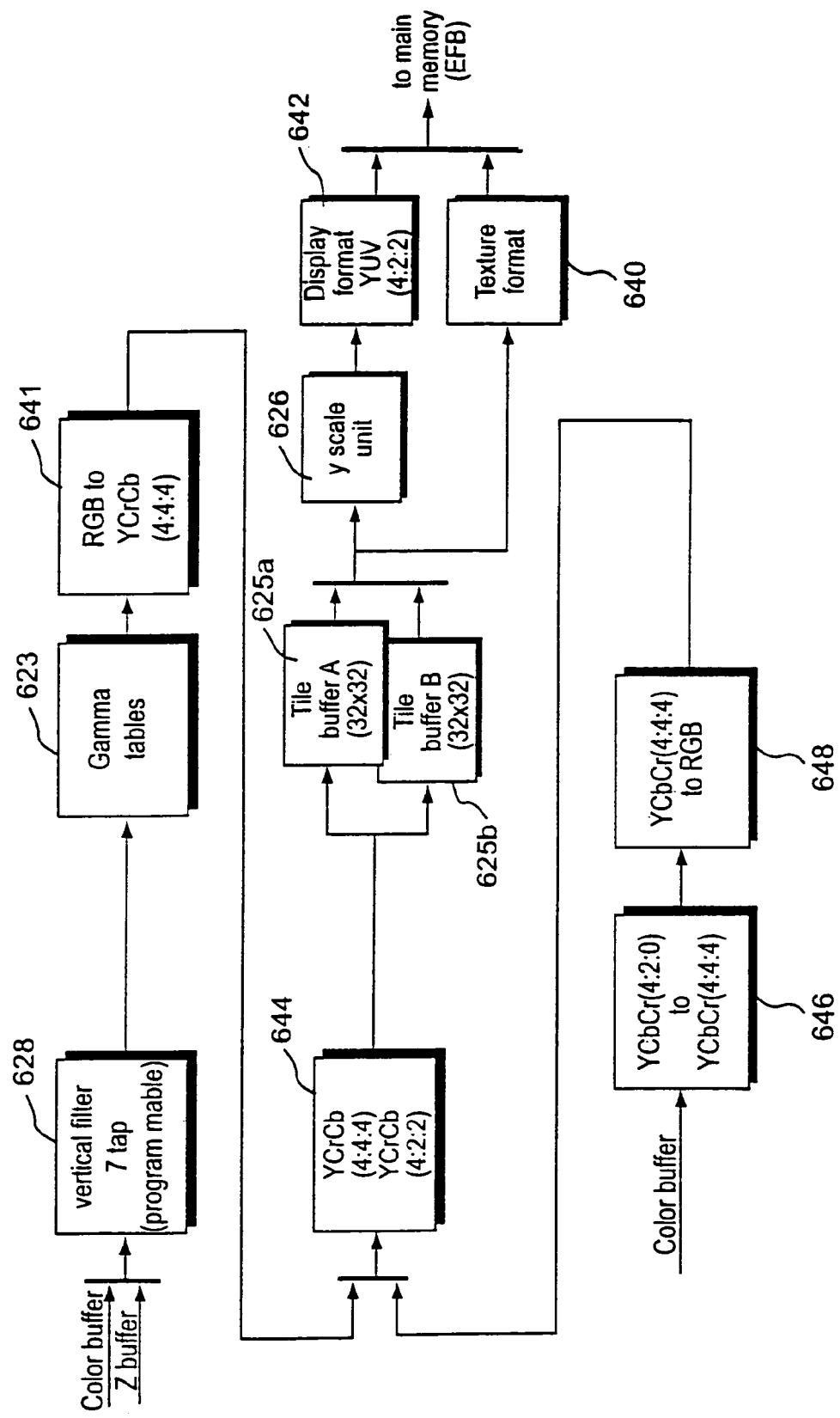
FIG. 12 shows a more detailed block diagram of the copy pipeline of FIG. 9.

A more complete block diagram of the copy out pipeline for all EFB configurations (i.e. RGB(A) and YUV) is shown in FIG. 12. FIG. 11 shows the various paths that data can take between the various elements of the system. As shown in FIG. 12, in order to reduce the amount of buffering needed for filtering operation in this example, a copy rectangle is broken into 32×32 tiles. The tiles are double buffered by using two tile buffers 625a and 625b, so that while one tile is being filled, the other is being read and processed to be sent to main memory. A rectangle is preferably decomposed into tiles in the Y direction, followed by tiles in the X direction. Within a tile 4 pixels in a span are processed in one cycle. The pixel quads are processed in Y order followed by X.

Figure 12A:
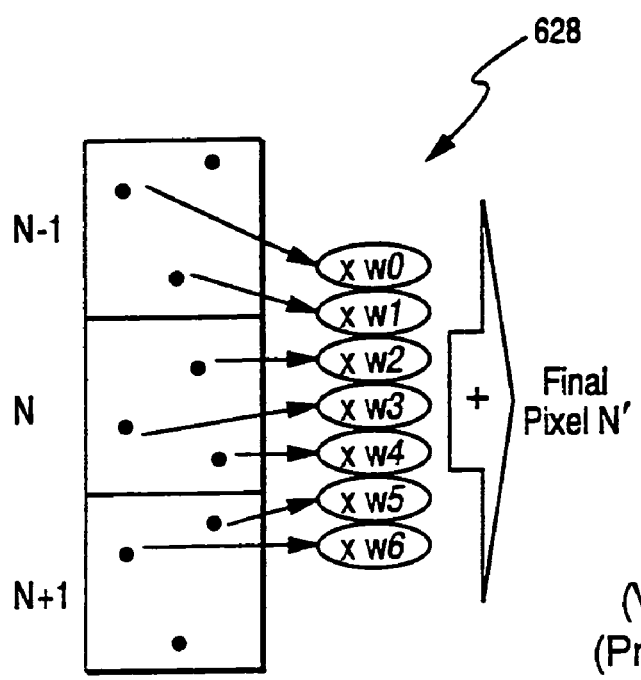
FIG. 12a shows an exemplary 7 tap vertical filter used for anti-aliasing in accordance with a preferred embodiment of the instant invention.
Figure 12B:
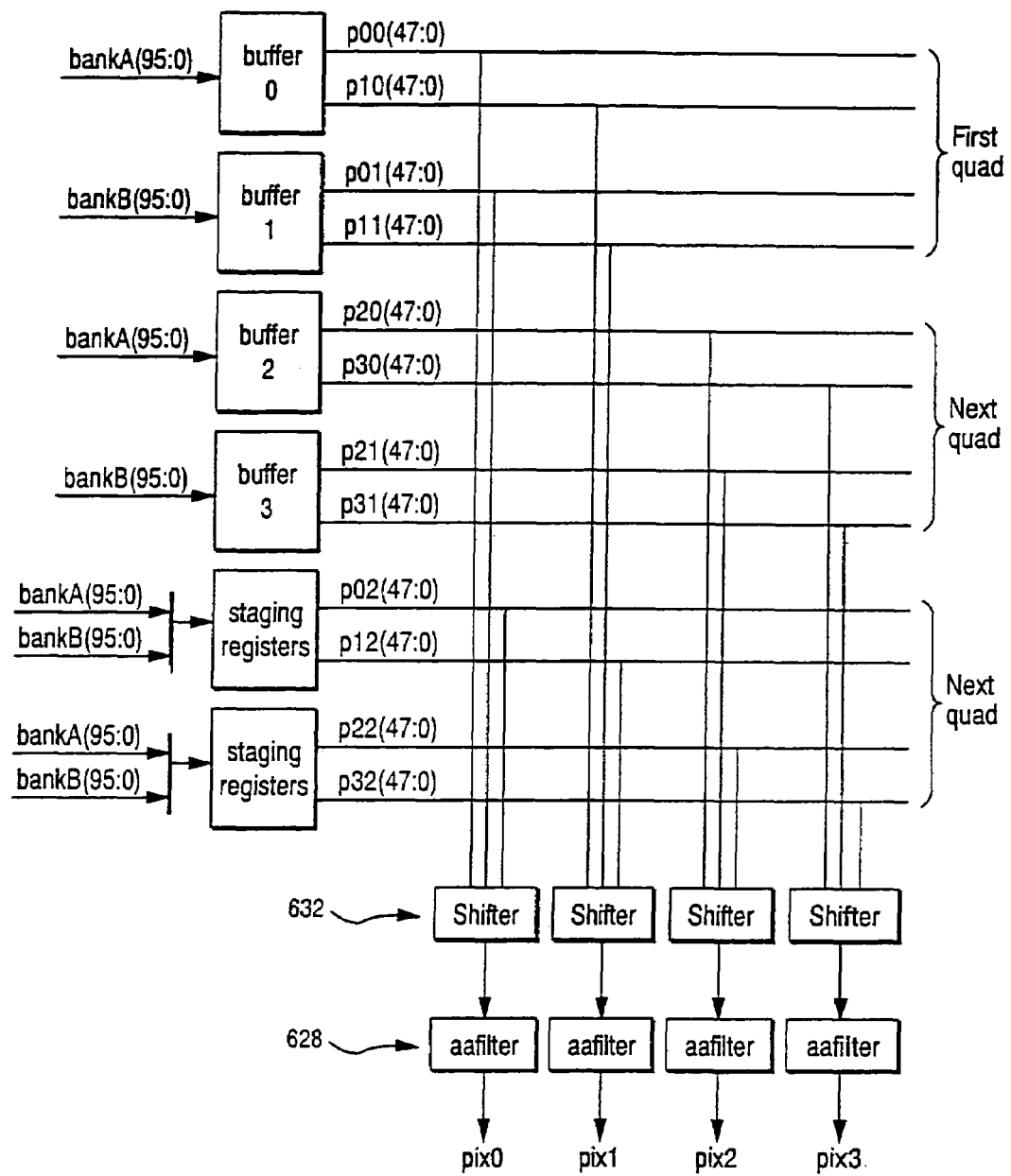
FIG. 12b shows a block diagram of the anti-aliasing buffering used in accordance with a preferred embodiment of the instant invention.
Figure 12C:
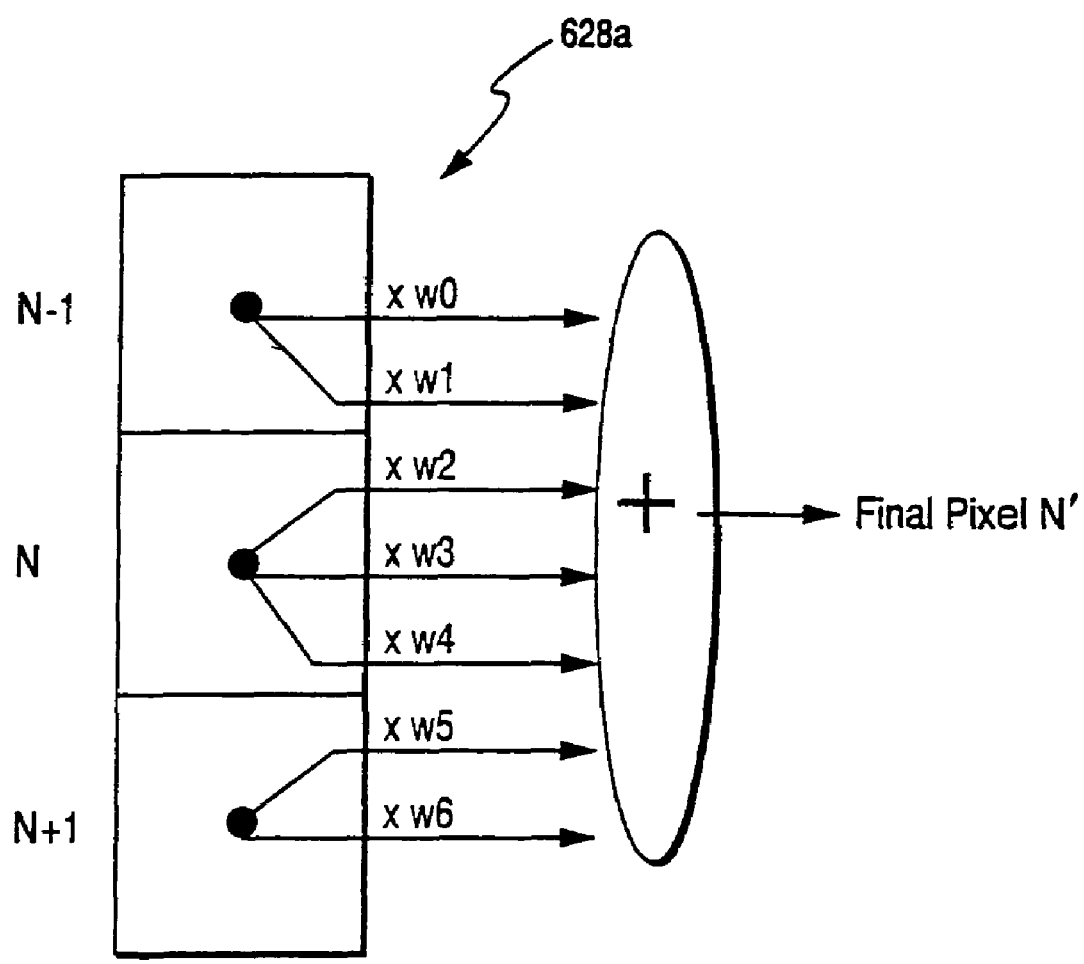
FIG. 12c shows the vertical filter of FIG. 12a used for de-flickering.
Figure 12D:
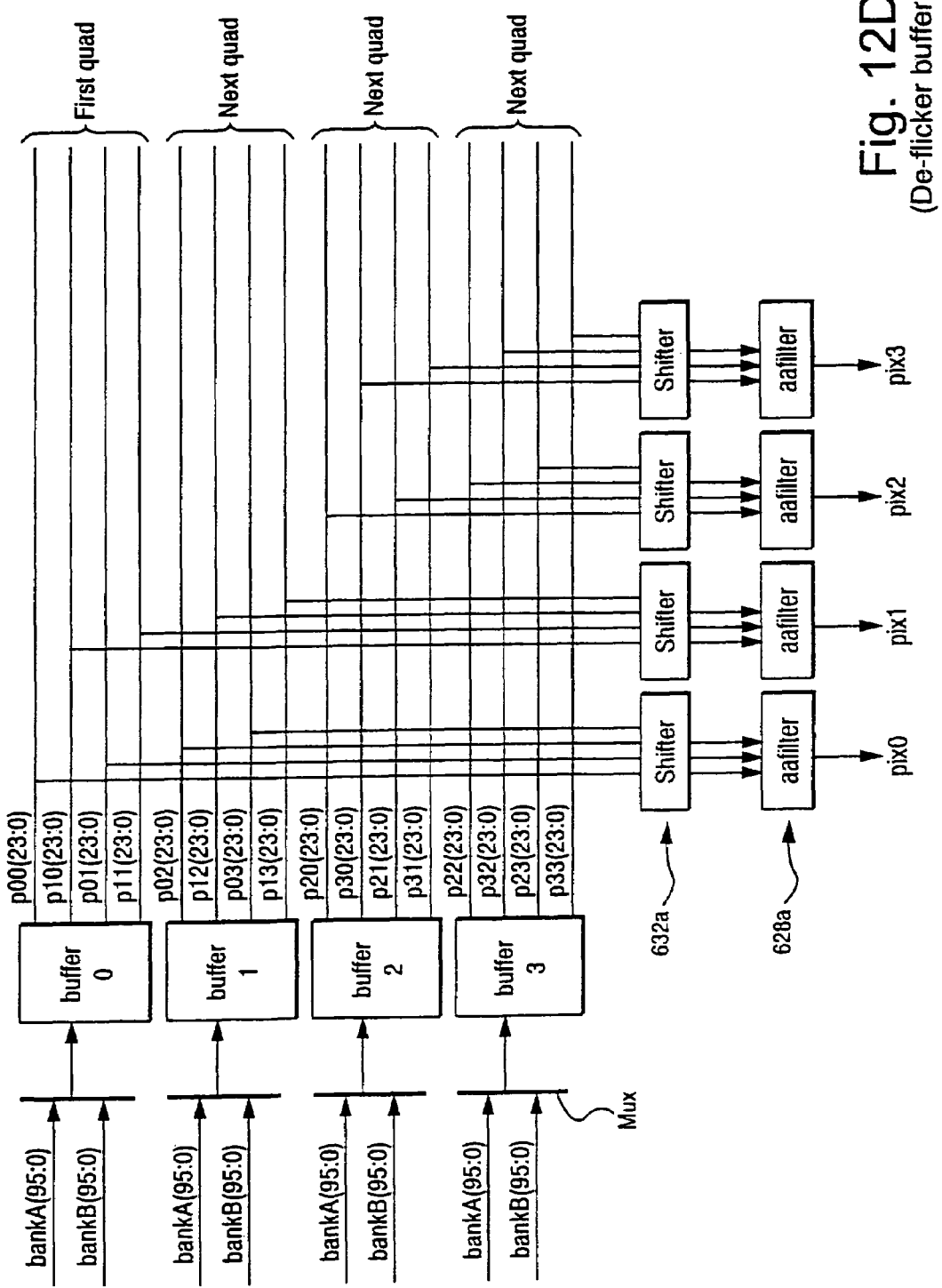
FIG. 12d shows a block diagram of the de-flickering buffering used in accordance with a preferred embodiment of the instant invention.
Figure 12E:
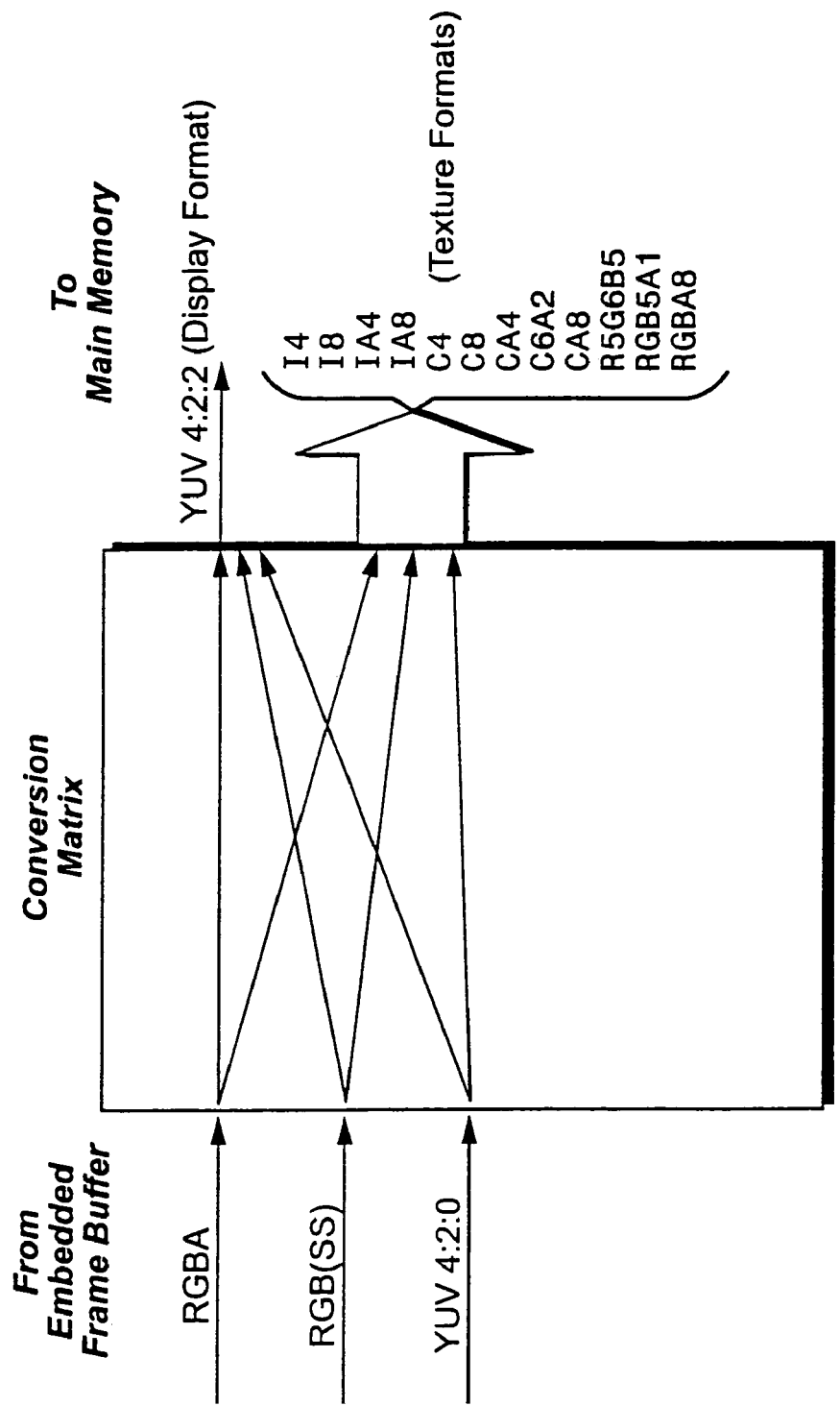
FIG. 12e shows a conversion matrix in accordance with a preferred embodiment of the invention.

Referring now more particularly to FIG. 12, the particular copy pipeline operation depends on the particular configuration of the data in the embedded frame buffer and on the programmers desired result of the copy out operation. As explained above, the color buffer may contain RGB8, RGBA6, R5G6B5 (anti-aliasing) or YUV420 data, and the Z buffer may contain 24-bit Z or 3×16-bit Z (anti-aliasing). FIG. 12e shows a preferred conversion matrix for the various data formats available in this example.

If the embedded frame buffer is configured for and contains data in any of the RGB(A) formats describe above, the copy pipeline performs anti-aliasing/deflickering operations, preferably using a programmable 7-tap vertical filter, as illustrated by block 628 in FIG. 12. As described in greater detail below, this filter blends the point sampled or supersampled (anti-aliasing) pixel data from multiple pixels and outputs a resulting pixel color. Once blended, gamma correction is performed, as illustrated by block 623. An optional conversion can then be performed, if desired for the particular application, to convert the RGB data to YUV444 format (block 641). If the data was converted to YUV 444 at block 641, then another optional conversion can be performed at block 644 to convert from YUV444 to YUV422. If the copy pipe is being used for display, this conversion to YUV422 can be performed to put the data in main memory display format, which is YUV422 in this example. The tile data is then buffered at tile buffers 625*a* and 625*b* as explained above. Then, if the tile is intended for display, Y scaling is performed at block 626, and the scaled data is copied out to main memory in YUV422 format (block 642) for use by the video interface. On the other hand, if the data is intended to be used as a texture, Y scaling is not performed. Instead, the tile data is formatted into the desired texture at block 640 and sent to main memory as a texture tile for possible use in a subsequent graphics pipeline operation. The possible texture formats in this example are shown in FIG. 12*e* and are listed below in connection with the texture copy commands and register bit definitions.

Figure 12F:
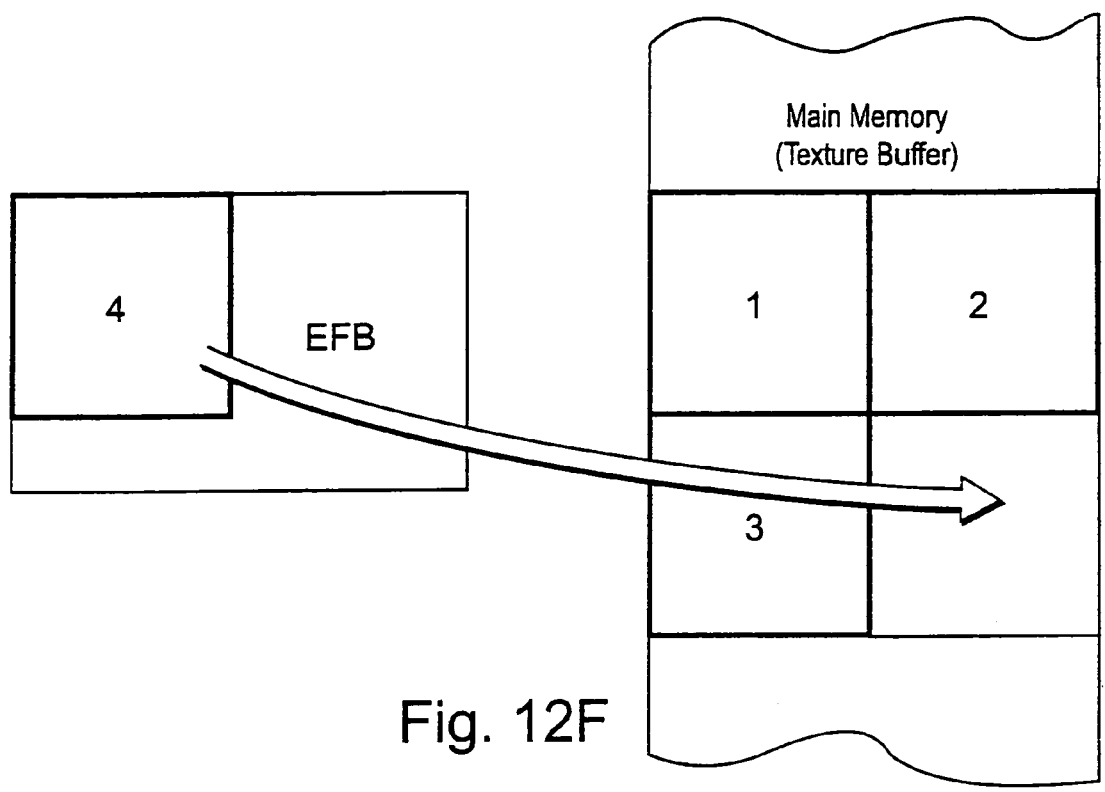
FIG. 12f shows texture tiles being stored in main memory.

If the embedded frame buffer is configured for and holds data in YUV420 format as described above, the copy pipeline has a slightly different operation as shown by the lower portion of FIG. 12. Specifically, the YUV420 data from the color buffer is first converted to YUV444 format (block 646). An optional conversion from YUV444 to RGB can then be performed at block 648. The data path is then the same as described above with respect to the RGB(A) configurations. That it, the tile can be optionally converted, at block 644, to YUV422 (if previously converted to YUV444), then buffered and either scaled and sent to main memory as display data or converted to a desired texture format and stored as a texture tile in main memory. FIG. 12*f* shows an example of how texture tiles (e.g. tiles 1-4) are stored in main memory.

Textures can be created by copying the Embedded Frame Buffer (EFB) to main memory using the GXCopyTex function. This is useful when creating dynamic shadow maps, environment maps, motion blur effects, etc.

All non-color index texture types except compressed textures (GX_TF_CMPR) can be created during the copy. The texture copy operation will create the correct tiling and formatting of the texture so it can be read directly by the hardware. Optionally, a box filter can be applied to the image in the EFB in order to create a lower level of detail (LOD) texture. The box filter can be used to create mipmaps from the EFB data. The following table shows exemplary texture copy formats and conversion notes.

| Format | Conversion |
| --- | --- |
| GX_TF_I4 | RGB -> (Y)UV, AA and non-AA pixel formats |
| GX_TF_I8 | RGB -> (Y)UV, AA and non-AA pixel formats |
| GX_TF_A8 | A (6 bits) -> A (8-bits, 2 MSBs replicated in LSBs), only with pixel format GX_PF_RGBA6_Z24 |
| GX_TF_IA4 | RGBA -> (Y)UV(A), if pixel format is not GX_PF_RGBA6_Z24, then A = 0xf |
| GX_TF_IA8 | RGBA -> (Y)UV(A), if pixel format is not GX_PF_RGBA6_Z24, then A = 0xff |
| GX_TF_RGB565 | RGB -> RGB, bits truncated for non-AA pixel formats. |
| GX_TF_RGB5A3 | RGBA -> RGBA, if pixel format is not GX_PF_RGBA6_Z24, then MSB = 1. i.e., R5G5B5 |
| GX_TF_RGBA8 | RGBA -> RGBA, if pixel format is not GX_PF_RGBA6_Z24, then A = 0xff |
| GX_TF_Z24X8 | Z (24 bits) -> Z (32 bits), only when pixel format is non-antialiased, GB_PF_RGB8_Z24 or GX_PF_RGBA6_Z24 |

Normally, the source and destination rectangles would have the same size. However, when copying small textures that will be composited into a larger texture the source and destination rectangles may differ. The format GX_TF_A8 is used specifically to copy the alpha channel from the EFB into a GX_TF_I8 formatted texture. The GX_TF_I8 will copy the luminance of the EFB into a GX_TF_I8 texture. When reading a texture, GX_TF_A8 and GX_TF_I8 are equivalent. When color textures are converted from an GX_PF_RGB8_Z24 pixel format to a lower-resolution color format, like GX_TF_RGB565, the least significant bits (LSBs) of the 8-bit colors are truncated. When color textures are converted from a lower resolution pixel format, such as GX_PF_RGB565_Z16, to a higher resolution texture format, such as GX_TF_RGB8, the most significant bits (MSBs) of each pixel are replicated in the LSBs of each texel. This conversion process distributes the estimation error evenly and allows each texel to represent the minimum or maximum value. In general, one should only copy textures containing alpha from an EFB with format GX_PF_RGBA6_Z24. When copying texture containing alpha from an EFB without alpha, alpha will be set to its maximum value. The GX_TF_Z24X8 format can be used to copy the 24-bit Z buffer to a 32-bit texture (equivalent format to GX_TF_RGBA8). To copy a texture, the application preferably first allocates a buffer in main memory the size of the texture to be copied. This size can be determined using, for example, a GXGetTexBufferSize function. This function preferably takes into account texture padding and texture type in its calculations.

As can be seen from the above description, the copy out process in accordance with the instant invention enables various data formats to be used and various conversions/operations to be performed such that significant flexibility and functionality is provided thereby. By supporting YUV formats and enabling copy out as a texture, the copy pipeline line can be used to, for example, assist the main processor in performing motion compensation. The copy out process as described above can be used not only to efficiently move and process data from the embedded frame buffer to the external frame buffer for display or as texture, but it also enables, for example, streaming video to be superimposed on a polygon by using the texture copy feature based on MPEG data which uses the YUV color space.

Each of the copy pipeline operations described above are explained in greater detail below.

Exemplary Anti-Aliasing During Copy Out

As briefly explained above, when anti-aliasing is desired and the embedded frame buffer is configured for the 96-bit anti-aliased pixel data (e.g. R5G6B5 and Z16), a second stage of anti-aliasing can be performed during copy out. Specifically, the second stage of anti-aliasing is performed by the anti-aliasing/deflicker section 622 during copy-out from the embedded frame buffer (EFB) 702 to the external frame buffer (XFB) 113.

The anti-aliasing/deflickering section 622 of the copy pipeline preferably applies a 7 tap vertical filter 628 (see FIG. 12*a*) having programmable weightings (W0-W6) for each super-sample. The support for the vertical filter is preferably a three-vertical-pixel area. Thus, when determining color for a current pixel N in anti-aliasing mode, super-samples in the pixel immediately above the current pixel (N−1), and super-samples in the pixel immediately below the current pixel (N+1), as well as super-samples in the current pixel are preferably used. Preferably, the farthest sample from the current pixel within each of the two surrounding pixels is not used in the filtering operation. Thus, while the three pixel support for the filter has nine samples, only seven of the nine samples are used in the blending operation in the example embodiment.

The resulting vertical filter output provides a single screen pixel color value (N') for eventual copying into the external frame buffer and display on display device 56.

In order to avoid the use of full line buffers, the copy operation preferably uses anti-aliasing (AA) buffering, wherein the copy is performed in strips of 32 pixels wide (X axis). The data-path for the strip-buffers in this exemplary AA buffering is shown in the block diagram of FIG. 12*b*.

It is noted that additional details regarding anti-aliasing/de-flickering techniques and arrangements are provided in the commonly owned and co-pending application identified above. Inasmuch as this invention is directed to the embedded frame buffer and the overall copy out operation, regardless of the specific anti-aliasing operation used, further details regarding anti-aliasing are not provided herein.

Exemplary De-Flicker Filtering During Copy Out

The same vertical filter can be used during copy-out in a non-anti-aliasing mode to achieve a de-flickering function using point sampled pixels. In this mode, the sample patterns are not programmable. As shown in FIG. 12*c*, the hardware uses only the center of the pixel as the sample locations. The weighting coefficients (W0-W6) for each point sample are programmable as with the anti-aliasing filter. Thus, the vertical filter 628*a* in de-flickering mode uses three inputs (center only) from the current pixel and two inputs (center only) from each of the two vertically neighboring pixels, thereby obtaining the seven values for the filtering operation. The programmable weighting coefficients are applied to the seven samples, and then the results are added to obtain the final pixel color (N'). Preferably, the de-flickering filter and AA filter are shared. The four strip buffers used in the AA data path (see FIG. 12*b*) are also used to store quad strips. An exemplary block diagram of the data-path for de-flicker buffering is shown in FIG. 12*d*. Further details regarding de-flickering are provided in the co-pending application identified above.

Example RGB to YUV Conversion During Copy Out

Figure 10A:
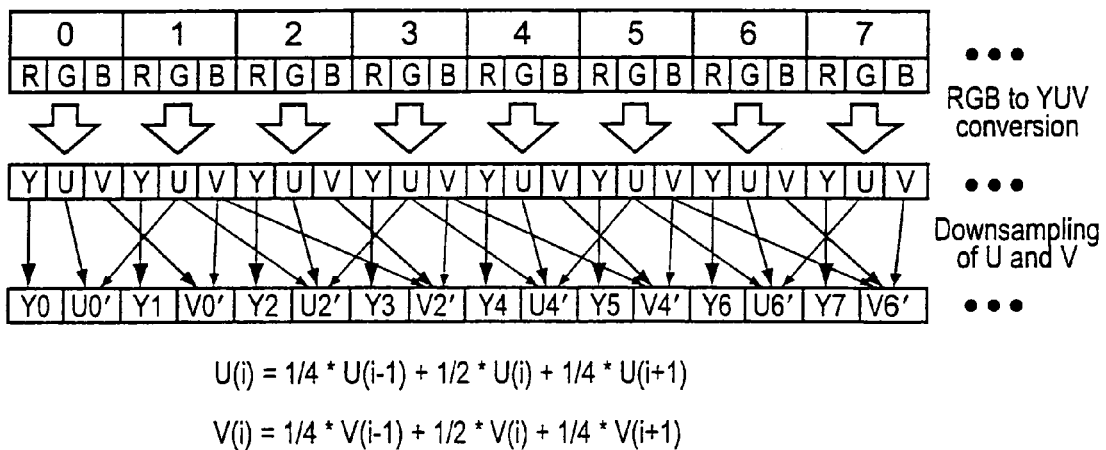
FIG. 10a illustrates an exemplary conversion of RGB format to YUV format.

A luma/chroma (YUV) format stores the same visual quality pixel as RGB, but requires only two-thirds of the memory. Therefore, during the copy operation, the RGB(A) format in the EFB is converted to a YUV format in the XFB, in order to reduce the amount of main memory used for the external frame buffer (XFB). This conversion is done by the RGB to YUV section 624. An illustration of the conversion operation is shown in FIG. 10*a*, wherein the RGB data is initially converted to YUV444 format and then down-sampled to YUV 422 format for storage in the XFB as display data.

Vertical (Y) Scaling During Copy Out

Figure 10B:
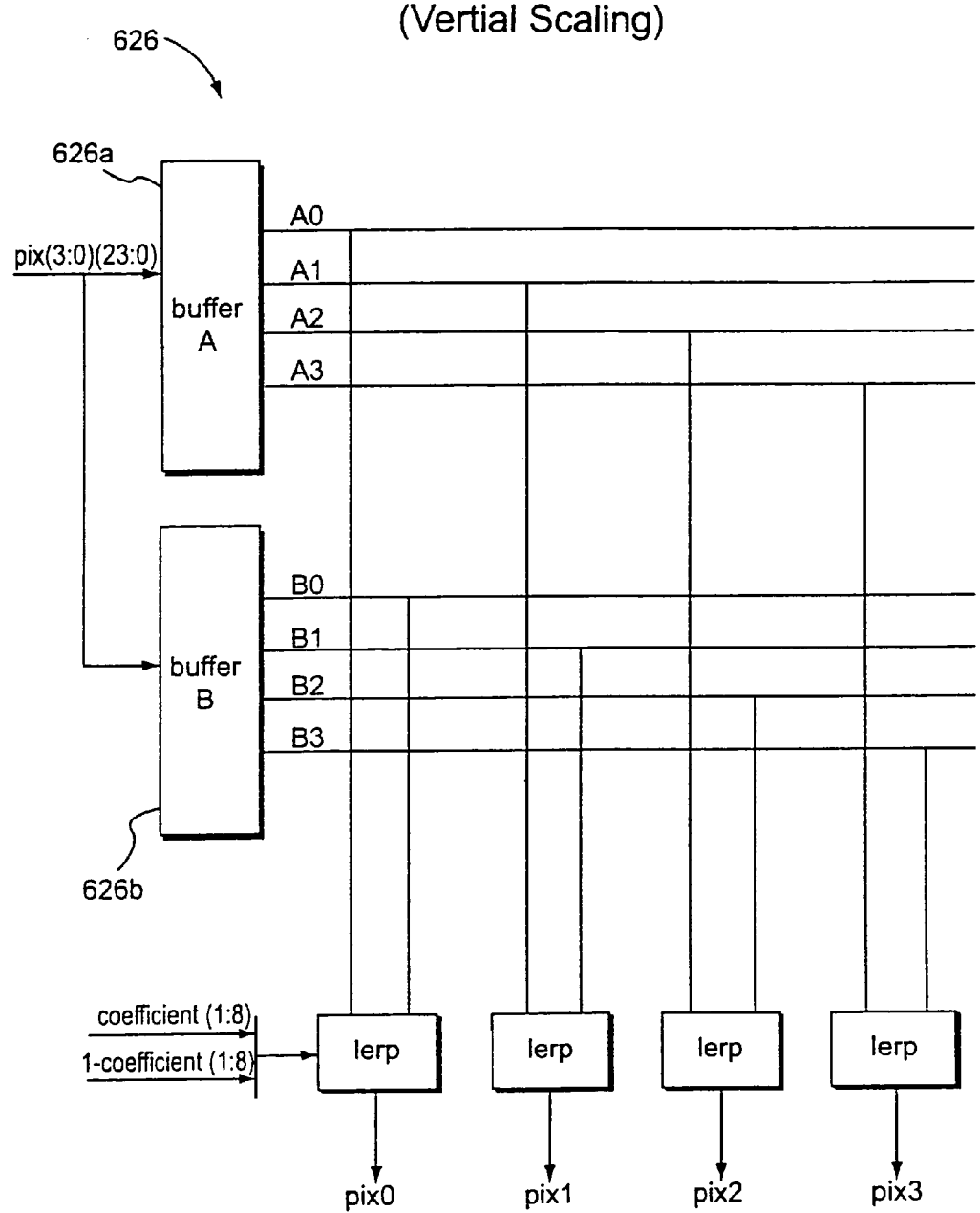
FIG. 10b shows an exemplary block diagram of the data paths used for vertical scaling.

The Y scale section 626 in the copy pipeline enables arbitrary scaling of a rendered image in the vertical direction. Horizontal scaling is preferably done during video display. A Y scale factor is defined in the API and determines the number of lines that will be copied, and can be used to compute the proper XFB size. A block diagram for the preferred vertical scaling in accordance with the instant invention is shown in FIG. 10*b*. Vertical scaling is performed by using 8-bit lerps between 2 adjacent vertically adjacent strips. The lerp coefficient starts at 1.0. After a scan-line is outputted a fixed point (1.8) value is added to the lerp coefficient. The carry out of the lerp coefficients signals that a new scan-line is to be used. Two strip buffers 626*a* and 626*b* are used to keep 2 partial scan-lines that are on top of each other. Buffer A (626*a*) holds all incoming strips with even y value, while buffer B (626*b*) holds all the odd y value strips.

Gamma Correction During Copy Out

The gamma correction section 623 is used to correct for the non-linear response of the eye (and sometimes the monitor) to linear changes in color intensity values. Three choices of gamma may be provided (such as 1.0, 1.7 and 2.2). The default gamma is preferably 1.0 and is set in, for example, a GXInit command in the API.

Example Conversion Operations Usable During Copy Out
RGB to YCrCb(4:4:4) conversion This conversion is used to reduce the amount of external frame-buffer needed by ⅓. The following equations are used for the conversion:

$$Y = 0.257R + 0.504G + 0.098B + 16$$

$$Cb = -0.148R - 0.291G + 0.439B + 128$$

$$Cr = 0.439R - 0.368G - 0.071B + 128$$

Four pixels in a scan-line are converted in one cycle.
YCrCb(4:4:4) to YCrCb(4:2:2)

Figure 13:
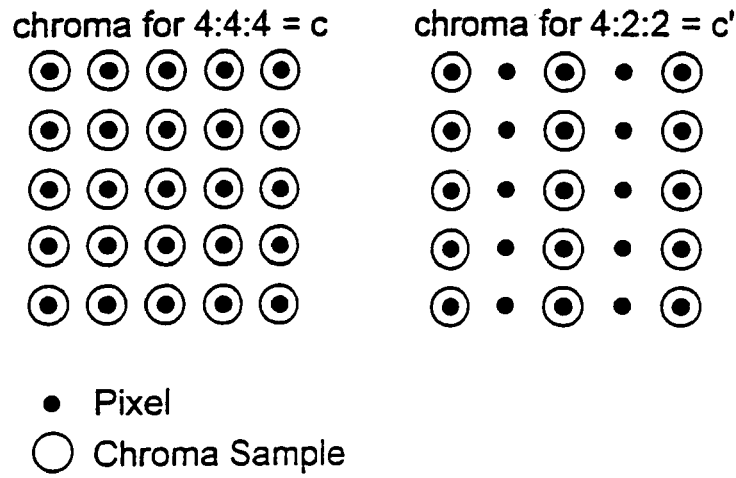
FIG. 13 illustrates down sampling conversion from YUV444 format to YUV422 format.

An illustration of the YUV444 to YUV422 conversion is shown in FIG. 13. The following equations are used for this conversion:

$$c'(0,0) = \tfrac{1}{4}*c(0,0) + \tfrac{1}{2}*c(0,0) + \tfrac{1}{4}*c(1,0)$$

$$c'(2,0) = \tfrac{1}{4}*c(1,0) + \tfrac{1}{2}*c(2,0) + \tfrac{1}{4}*c(3,0)$$

$$c'(4,0) = \tfrac{1}{4}*c(3,0) + \tfrac{1}{2}*c(4,0) + \tfrac{1}{4}*c(5,0)$$

$$c'(m,n) = \tfrac{1}{4}*c(m-1,n) + \tfrac{1}{2}*c(m,n) + \tfrac{1}{4}*c(m+1,n)$$

YCrCb(4:2:0) to YCrCb(4:4:4)

Figure 14A:
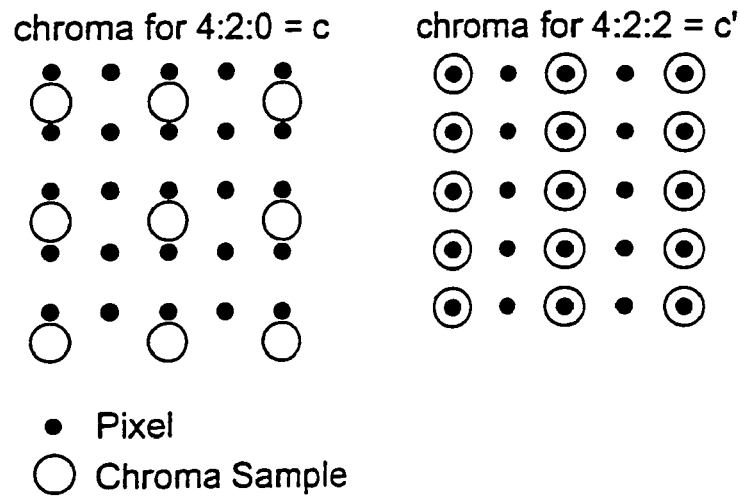
FIGS. 14a and 14b illustrate two conversions used to convert data from YUV420 format to YUV444 format.
Figure 14B:
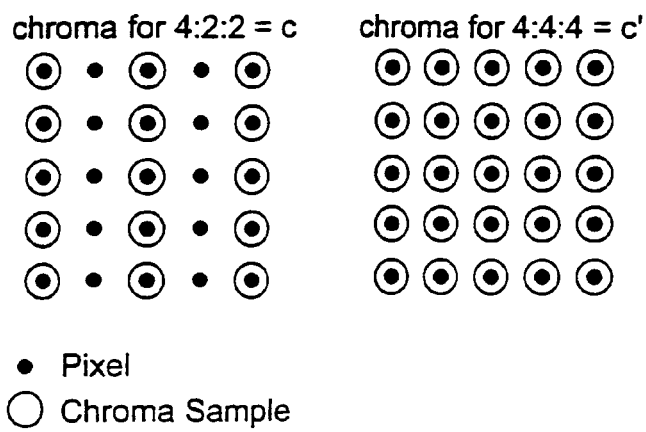

This conversion is done in two parts, as illustrated in FIGS. 14*a* and 14*b*. The first part, shown in FIG. 14*a*, converts from YUV420 format to YUV422 format. This conversion uses the following equations:

$$c'(0,0) = \tfrac{3}{4}*c(0,0.5) + \tfrac{1}{4}*c(0,0.5)$$

$$c'(2,0) = \tfrac{3}{4}*c(2,0.5) + \tfrac{1}{4}*c(2,0.5)$$

$$c'(4,0) = \tfrac{3}{4}*c(4,0.5) + \tfrac{1}{4}*c(4,0.5)$$

$$c'(0,1) = \tfrac{3}{4}*c(0,0.5) + \tfrac{1}{4}*c(0,2.5)$$

$$c'(2,1) = \tfrac{3}{4}*c(2,0.5) + \tfrac{1}{4}*c(2,2.5)$$

$$c'(4,1) = \tfrac{3}{4}*c(4,0.5) + \tfrac{1}{4}*c(4,2.5)$$

$$c'(0,2) = \tfrac{3}{4}*c(0,2.5) + \tfrac{1}{4}*c(0,0.5)$$

$$c'(2,2) = \tfrac{3}{4}*c(2,2.5) + \tfrac{1}{4}*c(2,0.5)$$

$$c'(4,2) = \tfrac{3}{4}*c(4,2.5) + \tfrac{1}{4}*c(4,0.5)$$

$$c'(m,n) = \tfrac{3}{4}*c(m,n-0.5) + \tfrac{1}{4}*c(m,n+1.5) \text{ for } n=\text{odd}$$

$$c'(m,n) = \tfrac{3}{4}*c(m,n+0.5) + \tfrac{1}{4}*c(m,n-1.5) \text{ for } n=\text{even}$$

The second part of this YUV420 to YUV444 conversion, as shown in FIG. 14*b*, up-samples the YUV422 data from part one above to YUV444. This conversion uses the following equations:

$$c'(0,0) = c(0,0)$$

$$c'(1,0) = \tfrac{1}{2}*c(0,0) + \tfrac{1}{2}*c(2,0)$$

$$c'(2,0) = c(2,0)$$

$$c'(3,0) = \tfrac{1}{2}*c(2,0) + \tfrac{1}{2}*c(4,0)$$

$c'(m,n)=c(m,n)$ $m$ is odd $c(m,n)=\frac{1}{2}*c(m-1,n)+\frac{1}{2}c(m+1,n)$ $m$ is even YcbCr (4:4:4) to RGB Conversion MPEG2 operates in YCbCr (YUV) color space. This conversion can be used to convert the YUV data to RGB data during copy out. The following equations are used for this conversions:

$R=1.164(Y-16)+1.596(Cr-128)$ $G=1.164(Y-16)-0.813(Cr-128)-0.391(Cb-128)$ $B=1.164(Y-16)+2.018(Cb-128)$

Four pixels in a scan-line are converted in one cycle.

Example Copy Out Commands

The EFB source and destination of the display copy operation is specified using an exemplary API function as follows:
GXCopyFBToDisplay Argument:

| u16 | SrcLeft | //Upper-Left coordinate of the source rectangle |
| u16 | SrcTop | |
| u16 | SrcWidth | //Width, in pixels, of the source rectangle |
| u16 | SrcHeight | //Height, in pixels, of the source rectangle |
| Void* | DstBase | //Address of destination buffer in memory |
| u16 | DstStride | //Stride, in multiple of 32B, of destination buffer |
| GXBool | Clear | //enable clearing color and Z frame buffers |

This function copies the contents of the embedded frame buffer (EFB) to the display buffer 113 in main memory. By the term "copy out" we don't mean simply a transfer of all the information; rather, we mean that the contents of the embedded frame buffer are read out, further processed (e.g., filtered, resampled, scaled, etc.) and that the resulting data is then sent elsewhere (e.g., to an external point sample type frame buffer). The origin of the rectangle is defined by SrcLeft(X) and SrcTop (Y). The Clear flag enables clearing of the color and z buffer to the current clear color and z values. The clearing of the embedded frame buffer preferably occurs simultaneously with the copy operation.

The following exemplary function can be used to set controls for the copy operations:
GXSetCopyControl Arguments:

| GXFbClamps | ClampFlags; | //Clamping flags for framebuffer filtering. |
| GXTexFormats | TexFormat; | //Format of texture (i.e. destination) pixels. |
| GXFbInterlace | Interlaced; | //Display buffer is interlaced (YUV422). |
| GXGamma | Gamma; | //Gamma correction on display buffer pixels. |
| u16 | VertScale; | //vertical 1/scale value (1.8 format). |
| GXBool | MipFilter; | // Apply mipmap filter (texture copy only). |

This function sets the controls used during copy from the embedded frame buffer to the display buffer. These controls are set once and then multiple copy commands can be issued.

The following is an exemplary API command for copying data out of the embedded frame buffer as a texture:
GXCopyFBToTexture Argument:

| u16 | SrcLeft | //Upper-Left coordinates of the source rectangle. |
| u16 | SrcTop; | |

-continued

| u16 | SrcWidth; | //Width, in pixels, of the source. |
| u16 | SrcHeight; | //Height, in pixels, of the source rectangle. |
| void* | DstBase; | //Address of destination buffer in memory (32B aligned). |
| u16 | DstStride; | //Stride, in multiple of 32 B, of destination buffer. |
| GXBool | Clear; | //Enable clearing color and z framebuffers. |

This function copies the embedded frame buffer to a texture image buffer in main memory in order to generate texture images for subsequent use by the graphics pipeline.

The following lists exemplary parameters that can be designated using the exemplary API commands above:

GXFbClamps:

| GX_CLAMP_TOP, | //Clamp top edge of image for filtering. |
| GX_CLAMP_BOTTOM, | //Clamp bottom edge of image for filtering. |

GXFbInterlace:

| GX_INTLC_OFF | //Interlace is off. |
| GX_INTLC_EVEN | //Interlace even lines. |
| GX_INTLC_ODD | //Interlace odd lines. |

GXZCmprFormats:

| GX_ZC_LINEAR, | //Linear 16 bit z. No compression. |
| GX_ZC_14E2 | //14e2 floating point format. |
| GX_ZC_13E3 | //13e3 floating point format. |

GXGamma:

| GX_GM_1_0 | //Gamma 1.0 |
| GX_GM_1_7 | //Gamma 1.7 |
| GX_GM_2_2 | //Gamma 2.2 |

GXTexFormats:

| GX_TF_I4 | //Intensity 4 bits |
| GX_TF_I8 | //Intensity 8 bits |
| GX_TF_IA4 | //Intensity-Alpha 8 bit (44) |
| GX_TF_IA8 | //Intensity-Alpha 16 bit (88) |
| GX_TF_C4 | //Color Index 4 bit |
| GX_TF_C8 | //Color Index 8 bit |
| GX_TF_CA4 | //Color Index + Alpha 8 bit (44) |
| GX_TF_C6A2 | //Color Index + Alpha 8 bit (62) |
| GX_TF_CA8 | //Color Index + Alpha 16 bit (88) |
| GX_TF_R5G6B5 | //RGB 16 bit (565) |
| GX_TF_RGB5A1 | //RGB 16 bit (5551) |
| GX_TF_RGBA8 | //RGB 32 bit (8888) |
| GX_TF_CMPR | //Compressed 4 bits/texel. RGB8A1. |

GXPixelFormats:

| GX_PF_RGB8_Z24 | |
| GX_PF_RGBA6_Z24 | |
| GX_PF_RGB565_Z16 | |
| GX_PF_Z24 | //used for z buffer copy (diagnostics only) |
| GX_PF_Y8 | |
| GX_PF_U8 | |

```
GX_PF_V8
GX_PF_YUV420    //used for YUV copy.
```

Example Pixel Engine Registers

Figure 15:
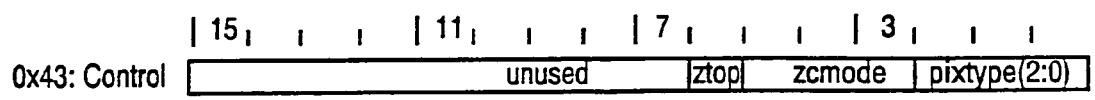
FIG. 15 shows an exemplary control register for use in defining a current pixel format.

FIGS. 15-17 show exemplary registers used by the pixel engine in connection with the copy out operations. Specifically, FIG. 15 shows an exemplary control register. The bit definitions for this exemplary control register are as follows:

Control Register Bits:

Bits 0-2 designate the pixel type for the copy operation. Writing to this control register causes the graphics pipe stages between the edge rasterizer (RAS0) and the pixel engine (PE) to be flushed. In this example, this will can take a minimum of 90 cycles. Writing to this register can also be used to sync up copy texture with rendering a primitive that uses the texture.

FIG. 16 shows an exemplary register for the copy to texture operation. The bit definitions for this exemplary register are as follows:

```
2:0  pixtype                                    5:3  zcmode   000: linear z compression for 16 bit Z
     000: RGB8/Z24                                            001: 14e2 z compression for 16 bit Z
     001:RGBA6/Z24                                            010: 13e3 z compression for 16 bit Z
     010:RGB_AA/Z16                                           011: 12e4 z compression for 16 bit Z
     011:Z (for copying Z buffer as texture)                  100: inverted_linear z compression for 16 bit Z
     100: Y8 or U8 or V8                                      101: inverted_14e2 z compression for 16 bit Z
     101: YUV 420 (only used for copy operation)              110: inverted_13e3 z compression for 16 bit Z
                                                              111: inverted_12e4 z compression for 16 bit Z
                                                 6: ztop     0: z at the end of the pipe
                                                             1: z buffering before texture mapping
```

Texture Copy Register Bits:

```
1:0 src_clamp
x1: clamp top
1x: clamp bottom
2 color conversion
0: no color conversion
1: convert RGB to YUV
6:3 tex_format
pixtype: rgb8, rgba6, rgb_aa    yuv8     yuv8     yuv8     yuv420   yuv420   z
yuvsel: x                       x        Y        U        V        x        x        x
ccv_mode: OFF                   ON       OFF      OFF      OFF      OFF      ON       OFF
0000: R4                        Y4       Y4       U4       V4       Y4       R4       z[23:20]
0001: R8                        Y8       Y8       U8       V8       Y8       R8       z[23:16]
0010: RA4                       YA4      YA4      UA4      VA4      YA4      RA4
0011: RA8                       YA8      YA8      UA8      VA8      YA8      RA8
0100: R5G6B5                    Y5U6V5   Y5Y6Y5   U5U6U5   V5V6V5   Y5Y6Y5   R5R6B5
0101: RGB5A3                    YUV5A3   YYY5A3   UUU5A3   VVV5A3   YUV5A3   RGB5A3
0110: RGBA8                     YUVA8    YYYA8    UUUA8    VVVA8    YUVA8    RGVA8    z[23:00], 0xff
0111: A8                        A8       0xff     0xff     0xff     0xff     0xff     0xff
1000: R8                        Y8       Y8       U8       V8       Y8       R8       z[23:16]
1001: G8                        U8       Y8       U8       V8       U8       G8       z[15:08]
1010: B8                        V8       Y8       U8       V8       V8       B8       z[07:00]
1011: RG8                       YU8      YY8      UU8      VV8      YU8      RG8      z[23:16]
            (red as intensity and Green as alpha)
1100 GB8                        UV8      YY8      UU8      VV8      UV8      GB8      z[15:00]
8:7 gamma (only when arc_format is any of the RGB formats)
00: gamma = 1.0
01: gamma = 1.7
10: gamma = 2.2
11: reserved
9: mip_map_filter
0: no filtering (1:1)
1: box filtering (2:1)
11: clr (should be set to 0 for rgb_aa)
0: do not clear Z and Color efb
1: clear Z and color efb
13:12 intlc
00: progressive
01: reserved
10: interlaced (even lines)
11: interlaced (odd lines)
16:15 ccv_mode
0X: automatic color conversion, based on pixtype and texture format
```

-continued

10: color conversion off (rgb to yuv)
11: color conversion on (rgb to yuv)

0x: automatic color conversion, based on pixtype and texture format
   10: color conversion off (rgb to yuv)
   11: color conversion on (rgb to yuv)

The pixel types allowed for this operation are RGB8, RGBA6, RGB_AA (i.e. anti-aliasing (R5G6B5)), YUV8 and YUV420. Bits 3-6 determine the format of the texture stored by the copy command in texture buffer. In this example, this texture formatting is done in the texture format section 640 shown in FIG. 12. In this example, Clr is not supported for pixel type YUV420 and should be set to 0. Gamma correction is also not supported for pixel type YUV420 in this example.

FIG. 17 shows an exemplary register for the copy to display operation. The bit definitions for this exemplary register are as follows:

Display Copy Register Bits:

| 1:0 src_clamp | 10:scen |
|---|---|
| x1: clamp top | 0: no vertical scaling |
| 1x: clamp bottom | 1: vertical scaling |
| 8:7 gamma (only when src_format is any of the RGB formats) | 11:clr (should be set to zero for rgb_aa) |
| 00: gamma = 1.0 | 0: do not clear Z and Color efb |
| 01: gamma = 1.7 | 1: clear Z and color efb |
| 10: gamma = 2.2 | 13:12 intlc |
| 11: reserved | 01: reserved |
| | 00: progressive |
| | 10: interlaced (even lines) |
| | 11: interlaced (odd lines) |

The pixel types allowed for this operation are RGB8, RGBA6, RGB_AA (anti-aliasing) and YUV420. Clr is not supported for pixel type YUV420 and should be set to 0. Gamma correction is also not supported for pixel type YUV420 in this example.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 18A:
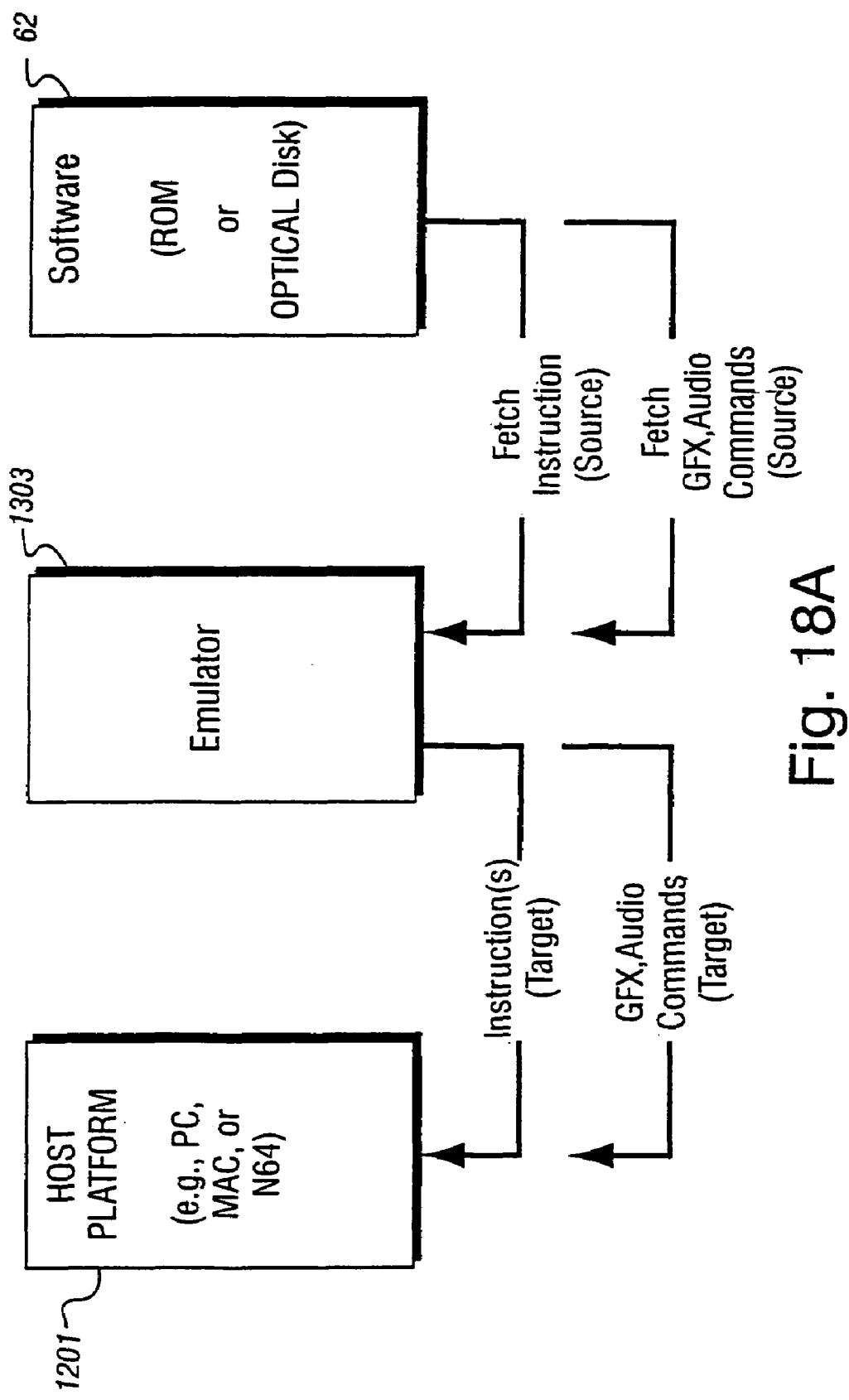
FIGS. 18A and 18B show example alternative compatible implementations.

FIG. 18A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 18B:
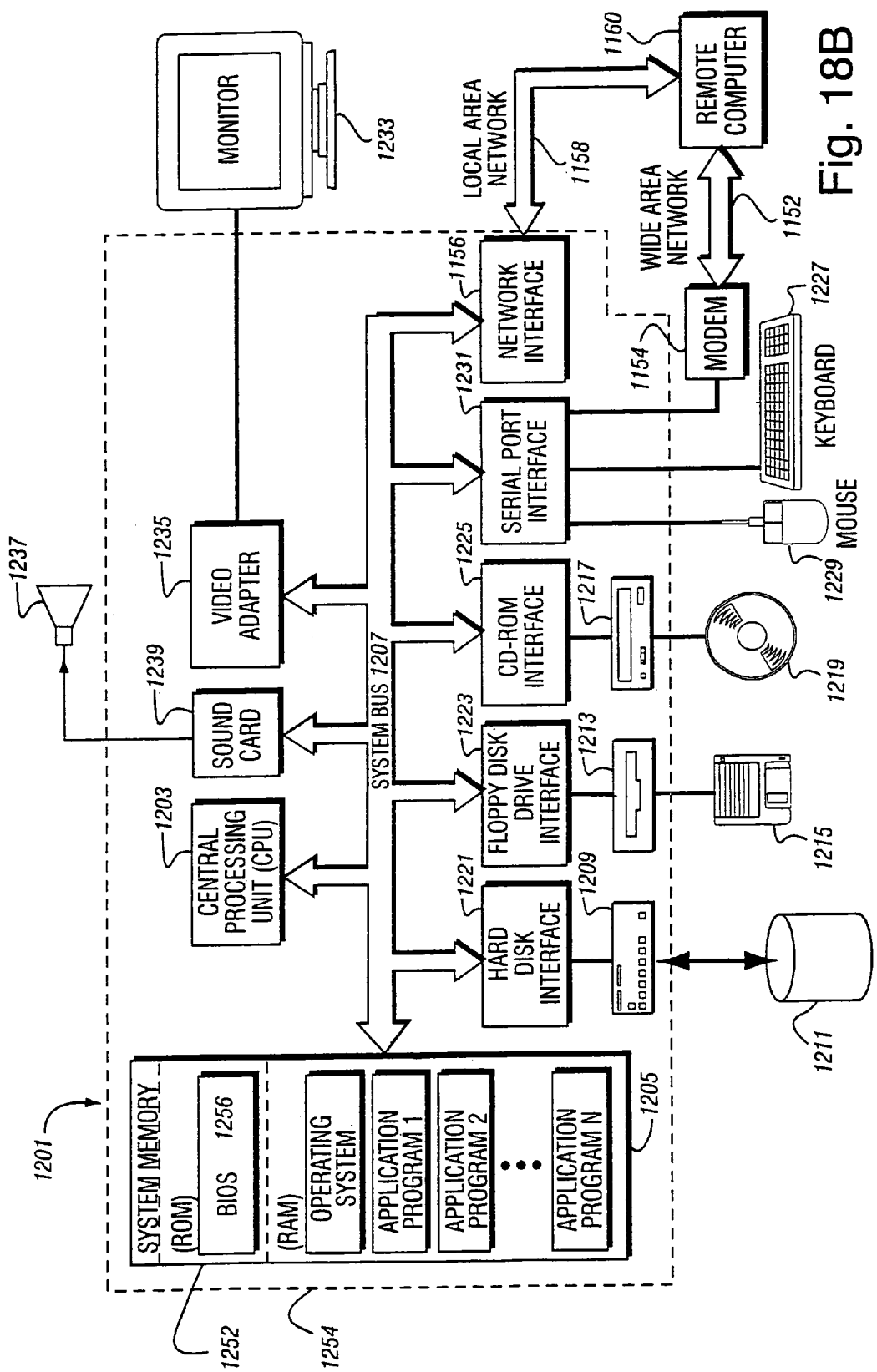

FIG. 18B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A graphics processor, including:
   image processing circuitry; and
   an embedded frame buffer;
   wherein the embedded frame buffer is selectively configurable to receive data in any of the following formats:
      point sampled color and depth;
      super-sampled color and depth; and
      YUV, wherein the point sampled format is a 48-bit format and the super-sampled format is a 96-bit format.

2. The graphics processor of claim 1, wherein the 48-bit format includes 24 color bits and 24 depth bits.

3. The graphics processor of claim 2, wherein the embedded frame buffer is further configurable such that the 24 color bits selectively include either 8 bits for red, 8 bits for blue and 8 bits for green (RGB8) or 6 bits for red, 6 bits for green, 6 bits for blue and 6 bits for alpha (RGBA6).

4. The graphics processor of claim 2, wherein the 96-bit format includes color and depth data for three super-sample locations for a pixel.

5. The graphics processor of claim 4, wherein the super-sample color data is 16 bits and the super-sample depth data is 16 bits.

6. The graphics processor of claim 5, wherein the 16 bit super-sample color data includes 5 bits for red, 6 bits for green and 5 bits for blue (R5G6B5).

7. The graphics processor of claim 1, wherein the YUV format is a YUV 4:2:0 format.

8. The graphics processor of claim 1, wherein the embedded frame buffer is a dynamic random access memory (DRAM).

9. A graphics system, comprising a graphics chip having graphics processing circuitry and an embedded frame buffer for storing frame data prior to sending the frame data to an external location, wherein the embedded frame buffer is selectively configurable between the following pixel formats:
   RGB8 and 24 bit Z;
   RGBA6 and 24 bit Z;
   Three R5G6B5 color and 16 bit Z super-samples; and
   YUV4:2:0.

10. The graphics system of claim 9, wherein in the YUV 4:2:0 configuration, a color buffer of the embedded frame buffer is partitioned to store 720×576 Y, 360×288 U and 360×288 V image planes for a YUV 4:2:0 frame.

11. The graphics system of claim 9, further including an interface to the graphics system that enables a programmer to selectively configure the embedded frame buffer.

12. The graphics system of claim 11, wherein the interface enables the embedded frame buffer to be reconfigured on a frame-by-frame basis.

13. In a graphics chip having pixel processing circuitry and an embedded frame buffer for storing pixel data prior to transferring the pixel data to an external destination, an improvement comprising:
   a reconfigurable embedded frame buffer which can be selectively configured to store any of the following pixel formats:

48 bit point sampled color and Z;
96 bit super-sampled color and Z; and
YUV.

14. The graphics chip of claim 13, wherein the embedded frame buffer is further selectively configurable to store the following 48 bit formats:
RGB8 and 24 bit Z; and
RGBA6 and 24 bit Z.

15. The graphics chip of claim 13, wherein the YUV format is a YUV 4:2:0 format.

16. A method of using an embedded frame buffer in a graphics system, including the steps of:
providing an embedded frame buffer that is selectively configurable to store image data in either RGB color format or YUV color format;
providing an interface to the graphics system which controls the configuration of the embedded frame buffer; and
enabling the RGB color format to be configured as either a 48-bit point sampled color and Z format or a 96-bit super-sampled color and Z format.

17. The method of claim 16, further including enabling the 48-bit format to selectively include an RGB8 and 24 bit Z format or an RGBA6 and 24 bit Z format.

18. The method of claim 16, further including defining the YUV format as a YUV 4:2:0 format.

* * * * *